United States Patent
Liang

(10) Patent No.: US 12,394,091 B2
(45) Date of Patent: Aug. 19, 2025

(54) POSITIONING METHOD, SYSTEM AND APPARATUS FOR ADAS CALIBRATION DEVICE AND READABLE STORAGE MEDIUM

(71) Applicant: Autel Intelligent Technology Corp., Ltd., Shenzhen (CN)

(72) Inventor: Shaolin Liang, Shenzhen (CN)

(73) Assignee: Autel Intelligent Technology Corp., Ltd., Shenzhen (CN)

( * ) Notice: Subject to any disclaimer, the term of this patent is extended or adjusted under 35 U.S.C. 154(b) by 149 days.

(21) Appl. No.: 18/027,630

(22) PCT Filed: Sep. 7, 2021

(86) PCT No.: PCT/CN2021/116936
§ 371 (c)(1),
(2) Date: Mar. 22, 2023

(87) PCT Pub. No.: WO2022/062893
PCT Pub. Date: Mar. 31, 2022

(65) Prior Publication Data
US 2023/0410366 A1    Dec. 21, 2023

(30) Foreign Application Priority Data
Sep. 25, 2020   (CN) .......................... 202011023209.1

(51) Int. Cl.
G06T 7/80       (2017.01)
G06T 7/50       (2017.01)
H04N 23/90      (2023.01)

(52) U.S. Cl.
CPC .................. G06T 7/80 (2017.01); G06T 7/50 (2017.01); H04N 23/90 (2023.01); G06T 2207/30252 (2013.01)

(58) Field of Classification Search
CPC ... G06T 7/80; G06T 7/50; G06T 2207/30252; G06T 7/0004; G06T 7/62; G06T 7/73;
(Continued)

(56) References Cited

U.S. PATENT DOCUMENTS

| 10,026,239 B2 | 7/2018 | Kim et al. | |
|---|---|---|---|
| 2005/0096807 A1* | 5/2005 | Murray | G01B 11/2755 33/288 |

(Continued)

FOREIGN PATENT DOCUMENTS

| CN | 106157311 A | 11/2016 |
|---|---|---|
| CN | 108235776 A | 6/2018 |

(Continued)

OTHER PUBLICATIONS

Search Report of CN Patent Application No. 202011023209.1 issued on Jun. 25, 2023.
(Continued)

*Primary Examiner* — Michael E Teitelbaum
(74) *Attorney, Agent, or Firm* — Andrew C. Cheng

(57) ABSTRACT

An ADAS calibration system includes an ADAS calibration device and a user equipment. The ADAS calibration device includes an image acquisition assembly. The user equipment is communicatively connected to the ADAS calibration device. The method includes: obtaining a relevant image of a vehicle acquired by the image acquisition assembly of the ADAS calibration device by the user equipment, determining position information of the ADAS calibration device relative to the vehicle according to the relevant image of the vehicle by the user equipment, and providing a position adjustment scheme for the ADAS calibration device relative to the vehicle according to the position information by the user equipment, so that a user positions the ADAS calibration device to a preset position relative to the vehicle (Continued)

according to the position adjustment scheme. The present disclosure streamlines a process and improves the efficiency of positioning the ADAS calibration device.

14 Claims, 18 Drawing Sheets

(58) Field of Classification Search
CPC .......... G06T 2207/10004; G06T 2207/30268; H04N 23/90; G01B 21/042; G01B 21/047; G01S 7/52004; G01S 15/931; G01S 7/4086; G01S 13/931; G01S 7/4026; G01S 13/89

See application file for complete search history.

(56) References Cited

U.S. PATENT DOCUMENTS

| | | | |
|---|---|---|---|
| 2020/0074675 | A1 | 3/2020 | Cejka et al. |
| 2020/0273206 | A1 | 8/2020 | Corghi |

FOREIGN PATENT DOCUMENTS

| | | |
|---|---|---|
| CN | 109141477 A | 1/2019 |
| CN | 109791045 A | 5/2019 |
| CN | 209524919 U | 10/2019 |
| CN | 110542376 A | 12/2019 |
| CN | 110646219 A | 1/2020 |
| CN | 110757146 A | 2/2020 |
| CN | 111380703 A | 7/2020 |
| CN | 111413111 A | 7/2020 |
| CN | 111457226 A | 7/2020 |
| CN | 111537015 A | 8/2020 |
| CN | 111609797 A | 9/2020 |
| CN | 111681286 A | 9/2020 |
| CN | 106864462 B | 10/2020 |
| CN | 112255627 A | 1/2021 |
| EP | 3699549 A1 | 8/2020 |
| IT | 201900002703 A1 | 8/2020 |
| KR | 20170068059 A | 6/2017 |
| WO | 2019015847 A1 | 1/2019 |
| WO | 2019127406 A1 | 7/2019 |

OTHER PUBLICATIONS

The second office action of CN Patent Application No. 202011023209.1 issued on Feb. 8, 2024.
Search Report of CN Patent Application No. 202011023209.1 issued on Feb. 8, 2024.
The extended European search report of EP patent application No. 21871265.1 issued on Jan. 23, 2024.
International Search Report of PCT Patent Application No. PCT/CN2021/116936 issued on Nov. 29, 2021.

\* cited by examiner

POSITIONING METHOD, SYSTEM AND APPARATUS FOR ADAS CALIBRATION DEVICE AND READABLE STORAGE MEDIUM

CROSS-REFERENCE TO RELATED APPLICATIONS

The application is a U.S. national stage application of International Application Serial No. PCT/CN2021/116936 filed on Sep. 7, 2021, which claims priority to Chinese Patent Application No. 202011023209.1, entitled "Positioning Method, System and Apparatus for ADAS Calibration Device and Readable Storage Medium", filed on Sep. 25, 2020, before the Patent Office of the China National Intellectual Property Administration, both of which are incorporated herein by reference in their entireties.

TECHNICAL FIELD

The present application relates to the field of positioning an ADAS calibration device, and more particularly, to a positioning method, system and apparatus for an ADAS calibration device and a computer-readable storage medium.

BACKGROUND OF THE INVENTION

With the development of the automobile industry and the progress of science and technology, higher requirements have been set forth for the safety and comfort of automobile driving, and unmanned driving has become a major trend for automobile technology. Advanced driving assistance systems (ADAS), which are critical for the early and necessary stage of unmanned driving technology, have been applied to an increasing number of vehicles because people are caring more about the safety performance of vehicles. ADAS is believed to be a standard configuration for all vehicles very soon. In case of an ADAS failure or exception, it is necessary to calibrate the ADAS to a normal state so that the ADAS can function safely. Calibrating the ADAS system is preconditioned on properly positioning the ADAS calibration device.

However, a positioning system for an ADAS calibration device in the prior art needs to be operated by trained professionals who calculate the distance and angle for calibration by themselves and perform multiple times of positioning. The process is complex, tedious, and difficult to learn, resulting in low efficiency of positioning.

SUMMARY OF THE INVENTION

The embodiments of the present application provide a positioning method, system and apparatus for an ADAS calibration device and a computer-readable storage medium, with an object to streamline the process of positioning the ADAS calibration device and improve the efficiency of positioning the ADAS calibration device.

Embodiments of the present application provide a positioning method for an ADAS calibration device, including:
obtaining a relevant image of a vehicle acquired by the image acquisition assembly of the ADAS calibration device by the user equipment;
determining position information of the ADAS calibration device relative to the vehicle according to the relevant image of the vehicle by the user equipment; and
providing a position adjustment scheme for the ADAS calibration device relative to the vehicle according to the position information by the user equipment, so that a user positions the ADAS calibration device to a preset position relative to the vehicle according to the position adjustment scheme.

Furthermore, embodiments of the present application also provide a positioning system for an ADAS calibration device, including: an ADAS calibration device including an image acquisition assembly; a user equipment communicatively connected to the ADAS calibration device, where the user system includes a processor and a memory, the memory stores a plurality of instructions, and the processor loads the instructions stored in the memory to perform the steps of any positioning method for an ADAS calibration device according to the embodiments of the present application.

Accordingly, embodiments of the present application also provide an ADAS main frame calibration apparatus, including:
an obtaining unit configured for the user equipment to obtain a relevant image of a vehicle acquired by the image acquisition assembly of the ADAS calibration device;
a determining unit configured for the user equipment to determine position information of the ADAS calibration device relative to the vehicle according to the relevant image of the vehicle; and
a providing unit configured for the user equipment to provide a position adjustment scheme for the ADAS calibration device relative to the vehicle according to the position information, so that a user positions the ADAS calibration device to a preset position relative to the vehicle according to the position adjustment scheme.

Optionally, in some embodiments, the determining unit includes:
an evaluating subunit for evaluating whether the relevant image of the vehicle includes an image of a target attached to the vehicle by the user equipment;
a first determining subunit for, if not, determining by the user equipment that the position information of the ADAS calibration device relative to the vehicle is not within a preset range.

Optionally, in some embodiments, the evaluating subunit includes:
an evaluating module for evaluating whether the relevant image of the vehicle includes a preset number of images of the target by the user equipment;
a determining module for, if not, determining by the user equipment that the position information of the ADAS calibration device relative to the vehicle is not within a preset range.

Optionally, in some embodiments, the position adjustment scheme includes prompting a user to move the ADAS calibration system into the preset range.

Optionally, in some embodiments, the determining unit further includes:
a second determining subunit for determining a first distance from the ADAS calibration device to the head or tail of the vehicle according to the image of the first target by the user equipment, where the first distance is determined as a distance between the first target attached to the head or tail of the vehicle and the first camera.

Optionally, in some embodiments, the providing unit includes:
a first providing subunit for providing position adjustment information of the ADAS calibration device relative to the vehicle according to the first distance and a preset first desired distance by the user equipment.

Optionally, in some embodiments, the providing unit further includes:

a prompting subunit for prompting the user to enable fine adjustment by the user equipment if the user equipment detects that the first distance is equal to the first desired distance.

Optionally, in some embodiments, the determining unit further includes:

a third determining subunit for determining a thrust line of the vehicle according to the image of the second target by the user equipment; and a fourth determining subunit for determining an angle between a center line of the ADAS calibration device and the thrust line by the user equipment, where the center line of the ADAS calibration device refers to a straight line passing through the two camera modules.

Optionally, in some embodiments, the providing unit further includes:

a second providing subunit for providing the position adjustment scheme for the ADAS calibration device relative to the vehicle according to the angle and a preset desired angle by the user equipment.

Optionally, in some embodiments, the determining unit further includes:

a fifth determining subunit for determining a thrust line of the vehicle according to the image of the second target by the user equipment; and a sixth determining subunit for determining a second distance from a center point of the ADAS calibration device to an intersection point of the thrust line and a center line of the ADAS calibration device by the user equipment, where the center point of the ADAS calibration device refers to a midpoint of a line connecting the two camera modules, and the center line of the ADAS calibration device refers to a straight line passing through the two camera modules.

Optionally, in some embodiments, the providing unit further includes:

a third providing subunit for providing the position adjustment scheme for the ADAS calibration device relative to the vehicle according to the second distance and a preset second desired distance by the user equipment.

Optionally, in some embodiments, the determining unit further includes:

a seventh determining subunit for determining a height difference between the ADAS calibration device and the vehicle according to the image of the third target by the user equipment, where the height difference is determined as a height of the third target in the plane of the vehicle relative to the third camera.

Optionally, in some embodiments, the providing unit further includes:

a fourth providing subunit for providing the position adjustment scheme for the ADAS calibration device relative to the vehicle according to the height difference and a preset desired height difference by the user equipment.

Optionally, in some embodiments, the positioning apparatus for an ADAS calibration device further includes:

a first displaying unit for receiving a viewing instruction from a user by the user equipment and displaying the relevant image of the vehicle indicated by the viewing instruction.

Optionally, in some embodiments, the positioning apparatus for an ADAS calibration device further includes:

a second displaying unit for displaying a user operation guide by the user equipment, thereby guiding a user in moving the ADAS calibration device.

Furthermore, embodiments of the present application provide a computer-readable storage medium, and the computer-readable storage medium stores a plurality of instructions adapted to be loaded by a processor to perform any positioning method for an ADAS calibration device according to the embodiment of the present application.

According to the embodiments of the present application, a user equipment obtains a relevant image of a vehicle acquired by an image acquisition assembly of an ADAS calibration device, the user equipment determines position information of the ADAS calibration device relative to the vehicle according to the relevant image of the vehicle, and the user equipment provides a position adjustment scheme for the ADAS calibration device relative to the vehicle according to the position information, so that a user positions the ADAS calibration device to a preset position relative to the vehicle according to the position adjustment scheme. The user needs only to position the ADAS calibration device to the preset position according to the adjustment scheme provided by the user equipment, without manual calculation of specific positioning parameters; otherwise, errors are inevitable, and the user has to determine by himself/herself in which direction the device is to be adjusted, which leads to low accuracy of positioning and repetitive operations. Through the positioning solution herein, the process of positioning the ADAS calibration device is streamlined, with improved positioning efficiency and calibration accuracy.

BRIEF DESCRIPTION OF DRAWINGS

To illustrate the technical solution in the embodiments of the present application more clearly, a brief description will be given below as necessary for the description of the embodiments. Apparently, the drawings in the description below are merely some, not all, embodiments of the present application, and those skilled in the art can obtain other drawings according to these drawings without any inventive effort.

DETAILED DESCRIPTION OF THE INVENTION

The technical solutions in the embodiments of the present application will now be described more fully hereinafter with reference to the accompanying drawings, in which some, but not all embodiments of the present application are shown. Any other embodiments obtained by a person skilled in the art on the basis of the embodiments herein without involving any inventive effort shall fall within the scope of the present application.

Embodiments of the present application provide a positioning method, system and apparatus for an ADAS calibration device, where a relevant image of a vehicle can be acquired through an image acquisition assembly of the ADAS calibration device, and a user equipment determines position information of the ADAS calibration device relative to a vehicle according to the relevant image of the vehicle acquired by the ADAS calibration device; the user equipment provides a position adjustment scheme for the ADAS calibration device relative to the vehicle according to the position information, so that a user positions the ADAS calibration device to a preset position relative to the vehicle according to the position adjustment scheme. As such, the user can position the ADAS calibration device only according to the position adjustment scheme, without having to learn from and refer to other materials, which reduces the steps and time for positioning the ADAS calibration device, improves the efficiency of positioning the ADAS calibration device, and renders a better user experience.

Figure 1:
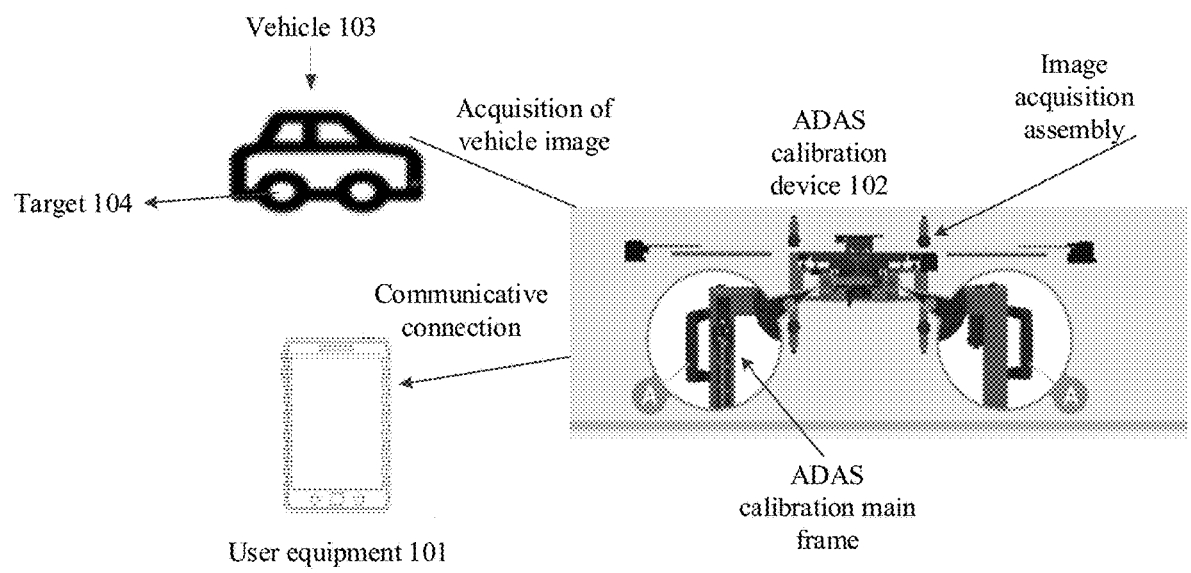
FIG. 1 is a schematic diagram showing a scenario of a positioning system for an ADAS calibration device according to an embodiment of the present application.

Embodiments of the present application provide an ADAS calibration system, as shown in FIG. 1, which shows a structure of the ADAS calibration system according to the embodiments of the present application. Specifically, in some embodiments, referring to FIG. 1, the ADAS calibration system 100 includes a user equipment 101 and an ADAS calibration device 102, where the user equipment and the ADAS calibration device are communicatively coupled. The ADAS calibration device is used for calibrating an advanced driving assistance system of a vehicle, and the ADAS calibration device is provided with calibration elements including calibration patterns, radar reflectors or other elements for calibrating image sensors or radar sensors. The calibration elements can be positioned at preset positions relative to a sensor to be calibrated using the ADAS calibration device. To position the calibration elements accurately, the ADAS calibration device needs to be positioned accurately. The ADAS calibration device is generally placed near the sensor to be calibrated on the vehicle, for example, on a head or tail of the vehicle. The preset position of the ADAS calibration device relative to the vehicle may vary in the case of different types of vehicles to be tested.

Specifically, the ADAS calibration device further includes an image acquisition assembly and a main frame for acquiring a relevant image of the vehicle 103 and transmitting the image to the user equipment. The user equipment may include a processor, a memory, a power supply, a displaying unit, etc. Specifically, a relevant image of a target 104 in the vehicle 103 is acquired by the image acquisition assembly of the ADAS calibration device 102, and more specifically, the target 104 is mounted on a center of a wheel of the vehicle 103.

Figure 2:
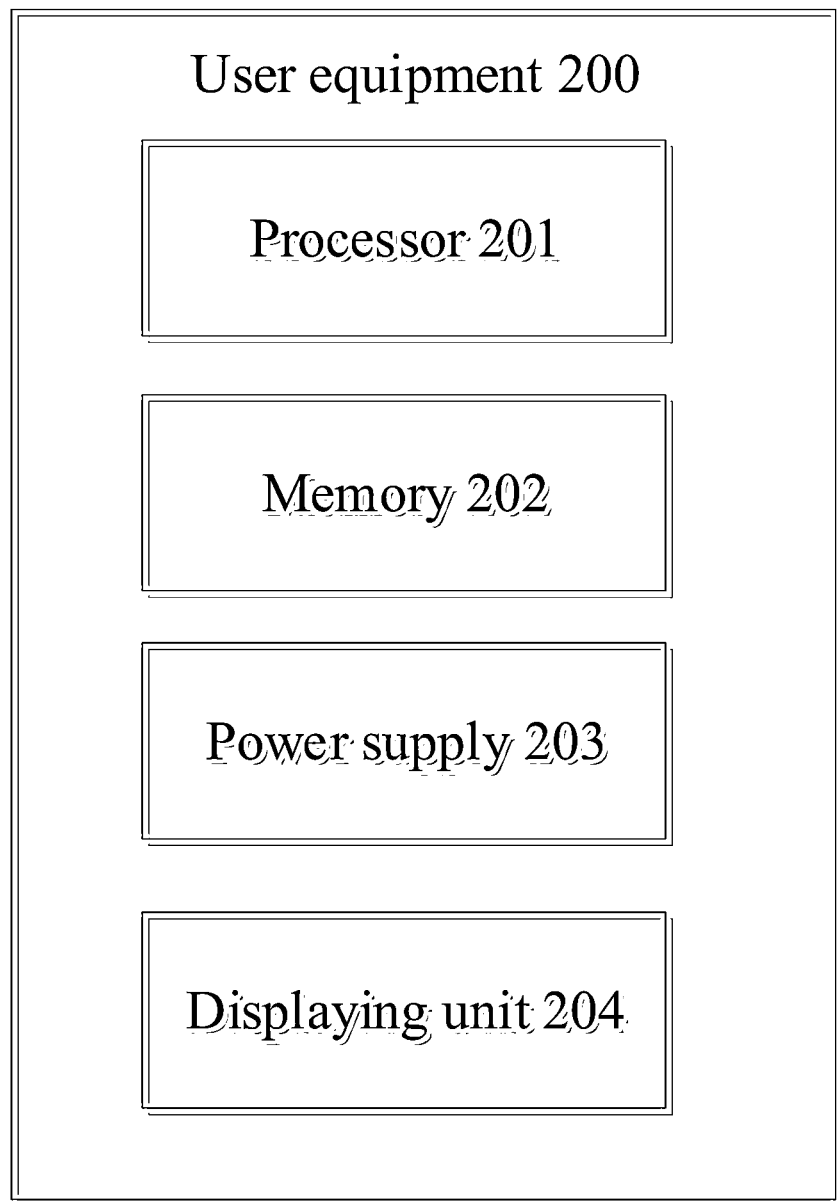
FIG. 2 is a schematic structural diagram of a user equipment according to an embodiment of the present application.

With further reference to FIG. 2, the user equipment may include components such as a processor 201 having one or more processing cores, a memory 202 having one or more computer-readable storage media, a power supply 203, and a displaying unit 204. It will be understood by those skilled in the art that the structure of the user equipment shown in FIG. 2 does not constitute a limitation of the user equipment and may include more or fewer components than shown; alternatively, some components may be combined, or different arrangements of components are possible. Herein, the processor 201 is a control center of the user equipment, and is connected to various parts of the whole user equipment through various interfaces and lines; the processor 201 performs various functions of the user equipment and processes data by running or executing software programs and/or modules stored in the memory 202 and invoking data stored in the memory 202, thereby monitoring the user equipment as a whole. Optionally, the processor 201 may include one or more processing cores; preferably, the processor 201 may integrate an application processor, which primarily handles operation systems, user interfaces, applications, etc., and a modem processor, which primarily handles wireless communications. It will be appreciated that the modem processor described above may not be integrated into the processor 201.

The memory 202 may be used for storing software programs and modules, and the processor 201 executes the software programs and modules stored in the memory 202 to perform various functional applications and data processing. The memory 202 may mainly include a stored-program partition and a store-data partition, where the stored-program partition may store an operation system, an application program required by at least one function (e.g., a sound playing function, or an image playing function), etc.; the store-data partition may store data created according to the use of the server, etc. In addition, the memory 202 may include a high-speed random-access memory and may also include a non-volatile memory, such as at least one magnetic disk storage device, flash memory device, or other volatile solid-state storage device. Accordingly, the memory 202 may further include a memory controller to allow the processor 201 to access the memory 202.

The user equipment further includes the power supply 203 for powering the various components. Preferably, the power supply 203 may be logically connected to the processor 201 through a power management system so that functions such as charging, discharging, and power consumption management are performed through the power management system. The power supply 203 may further include one or more of a DC or AC power source, a recharging system, a power failure detection circuit, a power converter or inverter, a power status indicator, and any other component.

The user equipment may further include the displaying unit 204, and the displaying unit 204 may be used for displaying data such as the position adjustment scheme for the ADAS calibration device relative to the vehicle.

Specifically, in this embodiment, the processor 201 in the user equipment loads executable files corresponding to proceedings of one or more executable programs into the memory 202 according to the following instructions, and the processor 201 runs the executable programs stored in the memory 202 to implement the method of any embodiment of the present application; for example, the user equipment obtains a relevant image of a vehicle acquired by the image acquisition assembly of the ADAS calibration device; the user equipment determines the position information of the ADAS calibration device relative to the vehicle according to the relevant image of the vehicle; the user equipment provides the position adjustment scheme for the ADAS calibration device relative to the vehicle according to the position information, so that the user positions the ADAS calibration device to the preset position relative to the vehicle according to the position adjustment scheme. As such, the user can position the ADAS calibration device only according to the position adjustment scheme, without having to learn from and refer to other materials, which reduces the steps and time for position the ADAS calibration device, improves the efficiency of positioning the ADAS calibration device, and renders a better user experience.

A detailed description is provided below. It is to be noted that the order in which the following examples are described is not to be taken as defining the preferred order of the examples.

Figure 3:
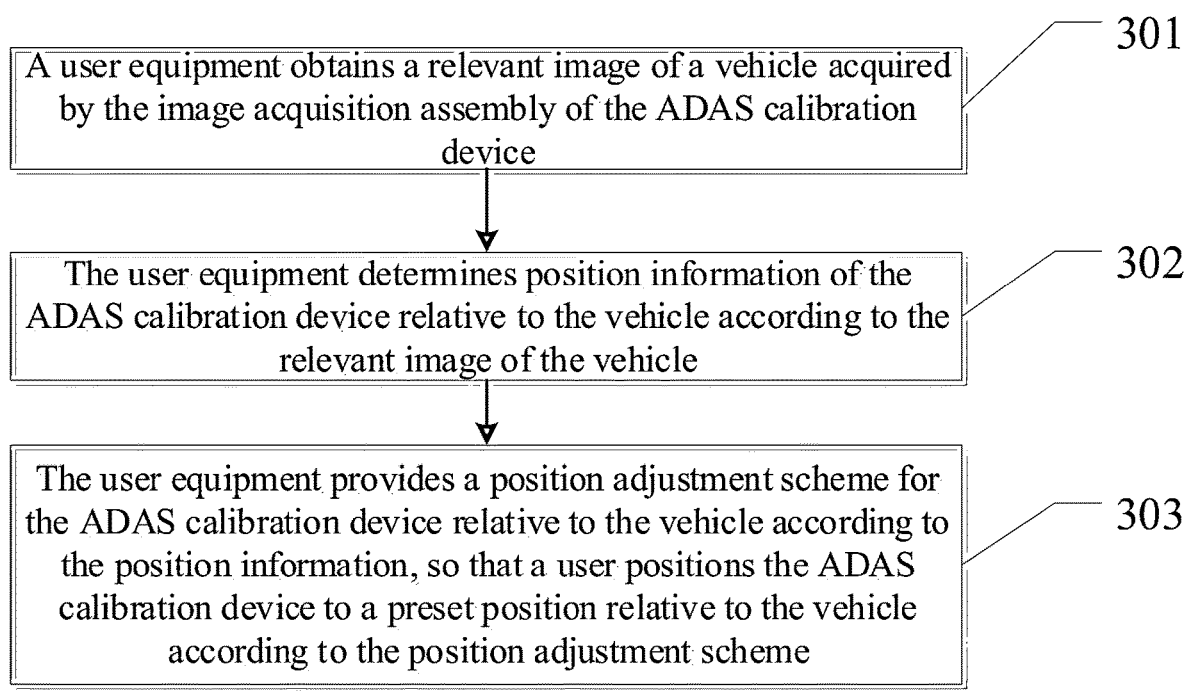
FIG. 3 is a flowchart of a positioning method for an ADAS calibration device according to an embodiment of the present disclosure.

Specifically, reference is made to FIG. 3, which is a flowchart of the positioning method for an ADAS calibration device according to an embodiment of the present application, and the method may be applied to the ADAS calibration system.

A specific process of the positioning method for an ADAS calibration device can be as follows.

In step 301, the user equipment obtains a relevant image of a vehicle acquired by the image acquisition assembly of the ADAS calibration device.

Specifically, in this embodiment, the relevant image of the vehicle is acquired by the image acquisition assembly of the ADAS calibration device. The user equipment then obtains the relevant image of the vehicle transmitted by the ADAS calibration device, where the user equipment is communicatively connected to the ADAS calibration device for transmission of information such as the relevant image of the vehicle.

Here, the relevant image of the vehicle includes an image of a target attached to a body of the vehicle, such as an image of a target attached to the vicinity of a rearview mirror of the vehicle or an extended plane of a radar mounted on a head of the vehicle, an image of a target attached to a wheel of the vehicle, and a contour image of the vehicle. The target described in the embodiment of the present application is provided with a preset pattern for the user equipment to determine a positional relationship of the vehicle relative to the image acquisition assembly. Here, the target attached to the body of the vehicle may be attached to the head or tail of the vehicle, or both sides of the body of the vehicle; further, the target may be attached to a center position of the head or tail of the vehicle, such as a position where an emblem is located. In some embodiments, an identification pattern originally inscribed onto the body of the vehicle, such as the emblem, may be taken as the target. The target attached to the wheel of the vehicle may be ones attached to both rear wheels of the vehicle, or to both front wheels of the vehicle, or to front and rear wheels on the same side of the vehicle, or to four wheels of the vehicle. The contour image of the vehicle may be one of the entire vehicle, one of a front half body of the vehicle including the head, one of a rear half body of the vehicle including a parking lot, one of the vehicle including either side of the body, or the like.

The relevant image of the vehicle at a position may be indicative of a feature of the vehicle, for example, indicative of a head or tail position of the vehicle, a position of a front or rear wheel of the vehicle, a position of a rearview mirror of the vehicle, a position of a radar mounted on the head of the vehicle, a center line or thrust line of the vehicle, etc. The center line of the vehicle passes through a midpoint of a line connecting two front wheels and a midpoint of a line connecting two rear wheels; the thrust line of the vehicle passes through the midpoint of the line connecting the two rear wheels and is perpendicular to the line connecting the two rear wheels. The relevant image of the vehicle is obtained according to the requirements of a calculation program in the user equipment for the position of the ADAS calibration device relative to the vehicle, or under the control of the user instructions sent to the user equipment.

In the ADAS calibration device, positions of the image acquisition assemblies on the ADAS calibration device and a number of the image acquisition assemblies may be set according to the requirements for the acquisition of the relevant image of the vehicle. In an implementation, the number of the image acquisition assemblies is three, where two image acquisition assemblies are provided at both ends of the ADAS calibration device for acquiring the image of the target attached to the wheel of the vehicle, and one image acquisition assembly is provided at approximately the center of the ADAS calibration device for acquiring the image of the target attached to the head or tail of the vehicle. The user equipment may control one or more image acquisition assemblies in the ADAS calibration device to acquire images. For example, the image acquisition assemblies, which are placed at both ends of the ADAS calibration device, are controlled to acquire the image of the target attached to the wheel simultaneously, or the image acquisition assembly, which is placed approximately at the center of the ADAS calibration device, is controlled to acquire the image of the target attached to the head or tail of the vehicle.

In step 302, the user equipment determines position information of the ADAS calibration device relative to the vehicle according to the relevant image of the vehicle.

Specifically, the user equipment calculates feature information of the vehicle, such as the head or tail of the vehicle, a center line of front wheels of the vehicle, a center line of rear wheels of the vehicle, a center line of a rearview mirror of the vehicle, an extended plane of a head radar, or a center line or thrust line of the vehicle, according to the relevant image of the vehicle; the user equipment determines a relative positional relationship between the image acquisition assembly in the ADAS calibration device and the vehicle, and determines the position information of the ADAS calibration device relative to the vehicle according to the relative positional relationship between the image acquisition assembly and the ADAS calibration device.

In some embodiments, the positioning of the image acquisition assembly relative to the ADAS calibration device may determine feature information of the ADAS calibration device.

An ADAS calibration device is exemplarily described below, and the feature information of the ADAS calibration device is explained in conjunction with the ADAS calibration device.

The ADAS calibration device includes a frame assembly and a crossbeam, and the frame assembly includes an undercarriage and a stand, where the stand is mounted on the undercarriage in a substantially vertical arrangement; the crossbeam is mounted on the stand and serves to carry the calibration elements, and the calibration elements are detachably mounted on the crossbeam at different positions, adapted to the calibration for different vehicle models or different sensors. Optionally, the crossbeam may also be moved vertically relative to the stand to adjust a height of the crossbeam, and in turn, to adjust a height of the calibration elements.

In some embodiments, each of both ends of the crossbeam is provided with one image acquisition assembly, and the image acquisition assemblies at both ends are used for acquiring images of targets on both sides of the vehicle. The relative positional relationship between the image acquisition assemblies at both ends can be known, for example, one of the two image acquisition assemblies includes a positioning camera, and the other includes a positioning target, where the positioning camera acquires an image of the positioning target, and then the relative positional relationship between the image acquisition assemblies at both ends is determined according to the image of the positioning target. According to the relative positional relationship between the image acquisition assemblies at both ends, the feature information of the ADAS calibration device can be determined as the information such as a center line of the crossbeam or a center point of the crossbeam. Herein, a coordinate of one of the image acquisition assemblies at both ends is taken as an origin point, and then a coordinate of the other image acquisition assembly relative to the origin point is determined; the center line of the crossbeam refers to a straight line passing through the coordinates of the image acquisition assemblies at both ends, and here, the coordinate does not include height data, that is, only the coordinates of the image acquisition assemblies at both ends perpendicularly projected on one plane are considered. The center point of the crossbeam refers to a center point calculated from the coordinates of the image acquisition assemblies at both ends. The center point of the crossbeam represents a center of the crossbeam.

In some embodiments, the crossbeam is further provided with a third image acquisition assembly disposed between both ends of the crossbeam at a position adjustable by an image to be acquired of a target. For example, the third image acquisition assembly is disposed in the middle of the crossbeam, or closer to one of the image acquisition assemblies at both ends, etc. The image acquisition assembly is used for acquiring an image of a target placed at the head or tail of the vehicle. Herein, the position of the image acquisition assembly relative to the vehicle is the position of the ADAS calibration device relative to the vehicle. Here, the position of the image acquisition assembly relative to the vehicle may not consider the height, that is, only the positional relationship in which the coordinates of the image acquisition assembly and the vehicle are projected on one plane is considered. The three image acquisition assemblies described above can communicate with the user equipment and transmit the acquired image to the user equipment so that the user equipment conduct image recognition and position information calculation; alternatively, the image acquisition assemblies conduct image recognition and position information calculation and then transmit to the user equipment.

It follows that the position information of the ADAS calibration device relative to the vehicle may be position information of a feature of the ADAS relative to a feature of the vehicle, or position information of an image acquisition assembly on the ADAS calibration device relative to a feature of the vehicle.

Herein, the position information of the feature of the ADAS calibration device relative to the feature of the vehicle may include: a perpendicular distance from the center line of the ADAS (i.e., the center line of the crossbeam) to the head or tail of the vehicle, the front or rear wheels, the rearview mirror, or the radar on the head of the vehicle; an angle between the center line of the ADAS and the center line or thrust line of the vehicle; and a distance from the center point of the ADAS to the center line or thrust line of the vehicle. The position information of the image acquisition assembly on the ADAS calibration device relative to the feature of the vehicle may include a perpendicular distance from the image acquisition assembly to the head or tail, the front or rear wheels, and the rearview mirror of the vehicle.

In some embodiments, the position information of the ADAS calibration device relative to the vehicle may include relative height information that may be acquired by an image acquisition assembly on the ADAS calibration device or measured by other sensors capable of measuring relative or measured height, such as distance sensors. The relative height information may include a comparison of the heights of the ADAS calibration device and the vehicle, for example, the vehicle is higher than the ADAS calibration device; alternatively, the relative height information may include a height difference between the ADAS calibration device and the vehicle. Herein, the relative height between the ADAS calibration device and the vehicle may refer to the height between a support surface of the ADAS calibration device and a support surface of the vehicle, for example, the support surface of the ADAS calibration device is the ground of a location where the calibration is conducted, and the support surface of the vehicle is a plane in which the vehicle is supported by a lifting machine. Alternatively, the relative height between the ADAS calibration device and the vehicle refers to a relative height between the calibration element on the ADAS calibration device and the sensor to be calibrated on the vehicle.

An exemplary implementation in which the user equipment determines the position information of the ADAS calibration device relative to the vehicle according to the relevant image of the vehicle is described below with reference to the accompanying drawings.

Figure 4A:
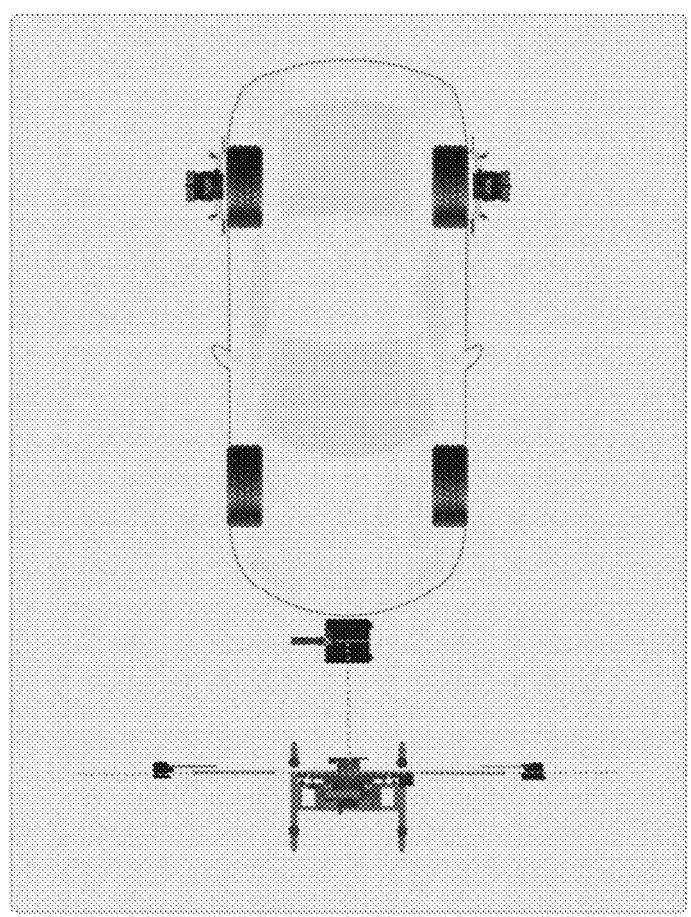
FIG. 4a is a schematic diagram of position information of an ADAS calibration device relative to a vehicle including distance information of the ADAS calibration device relative to a head of the vehicle when a relevant image of the vehicle is an image of a target attached to the head of the vehicle according to an embodiment of the present application.

Referring to FIG. 4a, the relevant image of the vehicle is an image of a target attached to the head of the vehicle. Here, the image of the target attached to the head of the vehicle may be acquired by the image acquisition assembly provided on the crossbeam of the ADAS calibration device. The position information of the ADAS calibration device relative to the vehicle includes distance information of the ADAS calibration device relative to the head of the vehicle. The distance information of the ADAS calibration device relative to the head of the vehicle is determined from the positional relationship between the target attached to the head and the image acquisition assembly, or from the positional relationship between the target attached to the head and the image acquisition assembly in conjunction with the positional relationship between the image acquisition assembly and the center line of the ADAS calibration device.

Figure 4B:
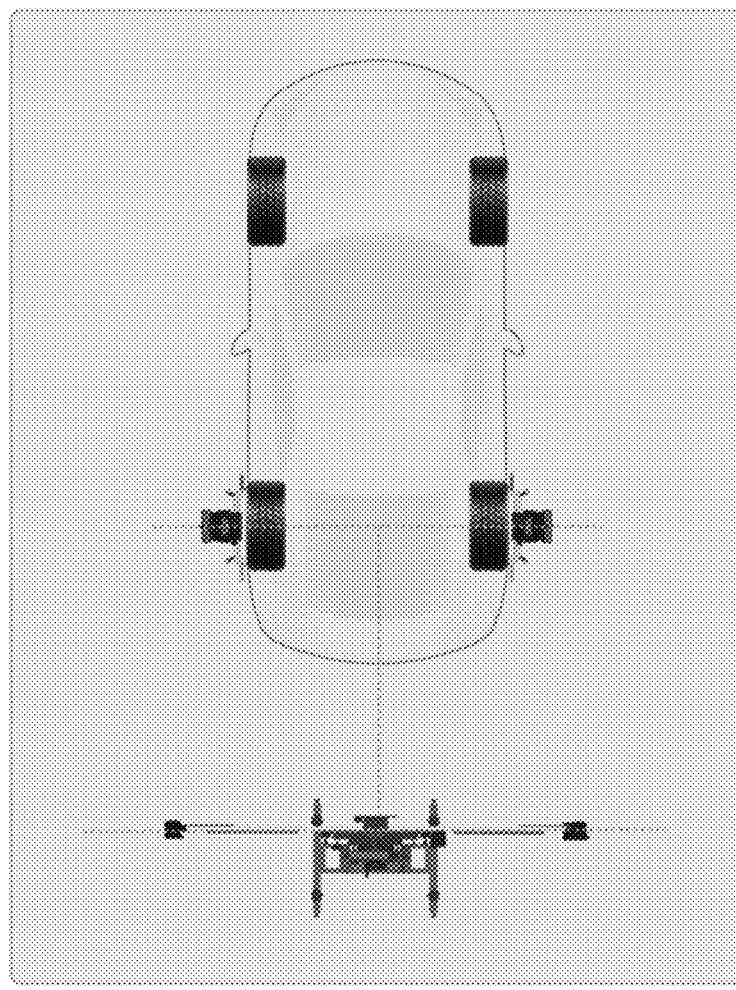
FIG. 4b is a schematic diagram of the position information of the ADAS calibration device relative to the vehicle including the distance information of the ADAS calibration device relative to rear wheels of the vehicle when the relevant image of the vehicle is an image of a target attached to the rear wheels of the vehicle according to an embodiment of the present application.

Referring to FIG. 4b, the relevant image of the vehicle is an image of a target attached to a rear wheel. Herein, one target is attached to each of the rear wheels on both sides, the images of the targets attached to the rear wheels on both sides can be respectively acquired by the image acquisition assemblies at both ends of the crossbeam of the ADAS device, and the ADAS calibration device is placed near the tail of the vehicle. The position information of the ADAS calibration device relative to the vehicle includes distance information of the ADAS calibration device relative to the rear wheel of the vehicle. The distance information of the ADAS calibration device relative to the rear wheel of the vehicle is a perpendicular distance from the center points of both rear wheels to the center line of the ADAS calibration device. Specifically, according to the positional relationship between the target attached to the rear wheel and the image acquisition assembly determined from the images of the two targets attached to the rear wheel acquired by the two image acquisition assemblies respectively and the positional relationship between the two image acquisition assemblies, the positional relationship between the two targets attached to the rear wheels is known, and then the positional relationship between the center point of the rear wheel and the center line of the ADAS calibration device is known, where the positional relationship of the center line of the ADAS calibration device is determined from the relative positional relationship between the two image acquisition assemblies.

Figure 4C:
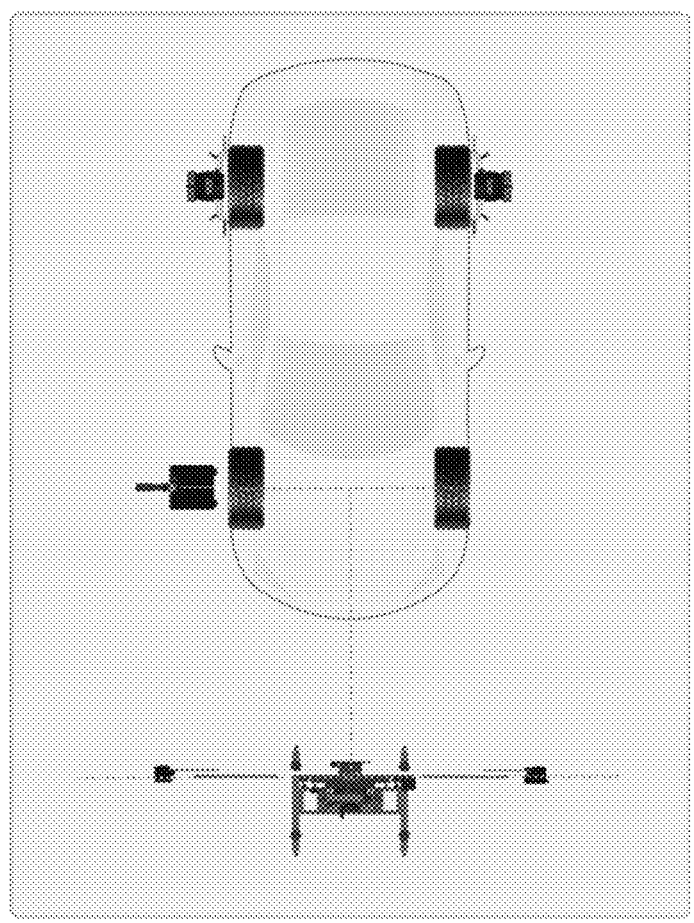
FIG. 4c is a schematic diagram of the position information of the ADAS calibration device relative to the vehicle including the distance information of the ADAS calibration device relative to front wheels of the vehicle when the relevant image of the vehicle is an image of a target attached to the front wheels of the vehicle according to an embodiment of the present application.

Referring to FIG. 4c, the relevant image of the vehicle is an image of a target attached to the front wheel. Here, the target attached to the front wheel may be provided on only one side of the vehicle or both sides of the vehicle. The image of the target attached to the front wheel is acquired by one or both of the image acquisition assemblies at both ends of the crossbeam of the ADAS calibration device. The position information of the ADAS calibration device relative to the vehicle includes distance information of the ADAS calibration device relative to the front wheel of the vehicle. The distance information of the ADAS calibration device relative to the front wheel of the vehicle is a perpendicular distance from the target attached to the front wheel of the vehicle to the center line of the ADAS calibration device, or a perpendicular distance from the center points of both front wheels to the center line of the ADAS calibration device.

Figure 4D:
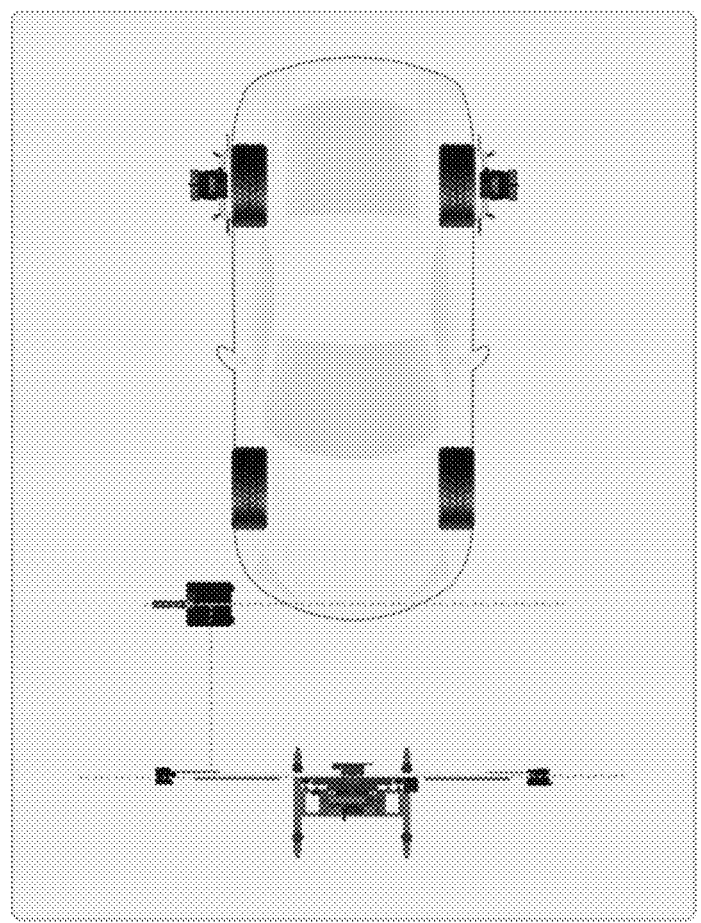
FIG. 4d is a schematic diagram showing that the distance information of the ADAS calibration device relative to a front radar of the vehicle is a perpendicular distance from a target in a plane of the front radar of the vehicle to a center line of the ADAS calibration device when the relevant image of the vehicle is an image of the target in the plane of the front radar on the head of the vehicle according to an embodiment of the present application.

Referring to FIG. 4d, the relevant image of the vehicle is an image of a target in the plane as of the front radar provided at the head of the vehicle. Here, the target in the plane of the front radar may be provided on only one side of the vehicle or both sides of the vehicle. The image of the targets in the plane of the front radar is acquired by one or both of the image acquisition assemblies at both ends of the crossbeam of the ADAS calibration device. The position information of the ADAS calibration device relative to the vehicle includes distance information of the ADAS calibration device relative to the front radar of the vehicle. The distance information of the ADAS calibration device relative to the front radar of the vehicle is a perpendicular distance from the target in the plane of the front radar of the vehicle to the center line of the ADAS calibration device.

Figure 4E:
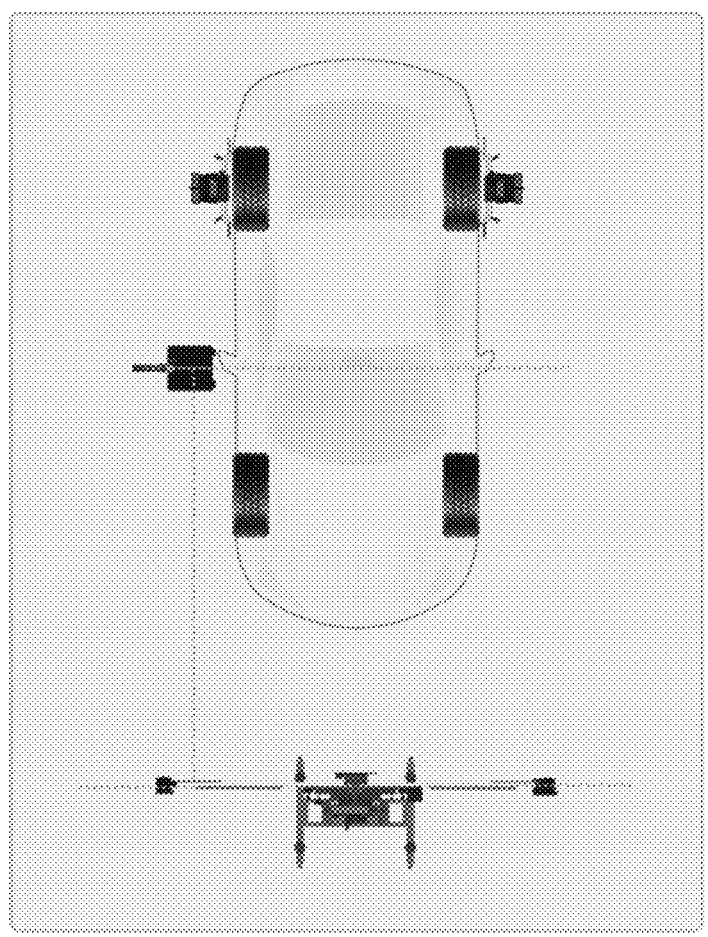
FIG. 4e is a schematic diagram showing that the distance information of the ADAS calibration device relative to a rearview mirror of the vehicle is a perpendicular distance from a target attached to the rearview mirror to the center line of the ADAS calibration device when the relevant image of the vehicle is an image of the target attached to the rearview mirror according to an embodiment of the present application.

Referring to FIG. 4e, the relevant image of the vehicle is an image of a target attached to the rearview mirror. Here, the target attached to the rearview mirror may be provided on only one side of the vehicle or both sides of the vehicle. The image of the target attached to the rearview mirror is acquired by one or both of the image acquisition assemblies at both ends of the crossbeam of the ADAS calibration device. The position information of the ADAS calibration device relative to the vehicle includes distance information of the ADAS calibration device relative to the rearview mirror of the vehicle. The distance information of the ADAS calibration device relative to the rearview mirror of the vehicle is a perpendicular distance from the target attached to the rearview mirror to the center line of the ADAS calibration device, or a perpendicular distance from the center points of both rearview mirrors to the center line of the ADAS calibration device.

Figure 4F:
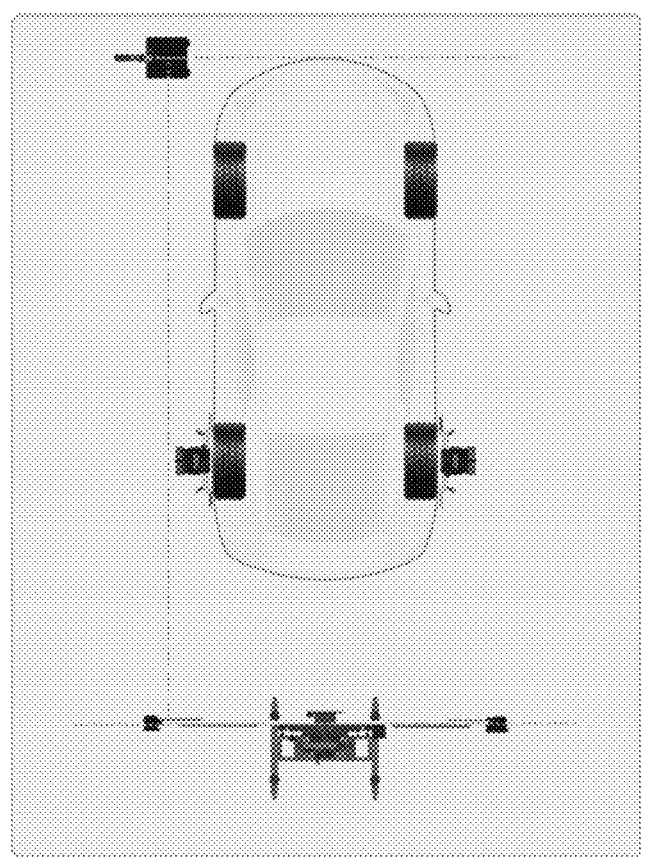
FIG. 4f is a schematic diagram showing that the distance information of the ADAS calibration device relative to the head of the vehicle is a vehicle distance from a target in a plane of the head of the vehicle to the center line of the ADAS calibration device when the relevant image of the vehicle is an image of the target in the plane of the head of the vehicle according to an embodiment of the present application.

Referring to FIG. 4f, the relevant image of the vehicle is an image of a target in the plane of the head of the vehicle. Here, the image of the target in the plane of the head of the vehicle is acquired by one of the image acquisition assemblies at both ends of the crossbeam of the ADAS calibration device, and the ADAS calibration device is placed at the tail of the vehicle. The position information of the ADAS calibration device relative to the vehicle includes distance information of the ADAS calibration device, when positioned at the tail of the vehicle, relative to the head of the vehicle. The distance information of the ADAS calibration device relative to the head of the vehicle is a perpendicular distance from the target in the plane of the head of the vehicle to the center line of the ADAS calibration device.

As described in connection with FIGS. 4a to 4f, the position information of the ADAS calibration device relative to the vehicle includes distance information to the vehicle. In an embodiment of the present application, the position information of the ADAS calibration device relative to the vehicle further includes a distance between the center point of the ADAS calibration device and the center line or thrust line of the vehicle, or an angle between the center line of the ADAS calibration device and the center line or thrust line of the vehicle.

Figure 4G:
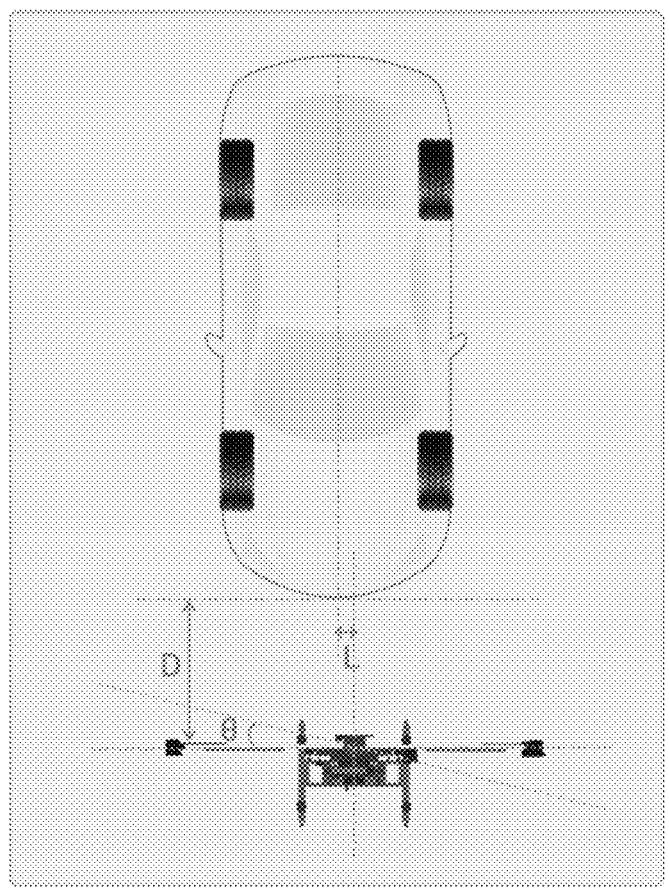
FIG. 4g is a schematic diagram showing that the position information of the ADAS calibration device relative to the vehicle includes: a distance D from the ADAS calibration device to the head of the vehicle, an angle (90°−θ) between the center line of the ADAS calibration device and a thrust line or center line of the vehicle, and a perpendicular distance L between a center of the ADAS calibration device and the thrust line or center line of the vehicle according to an embodiment of the present application.

Referring to FIG. 4g, the position information of the ADAS calibration device relative to the vehicle includes a distance D from the ADAS calibration device to the head of the vehicle, an angle (90°−θ) between the center line of the ADAS calibration device and the thrust line or center line of the vehicle, a perpendicular distance L between the center point of the ADAS calibration device and the thrust line or center line of the vehicle, or a perpendicular distance L between a center axis of the ADAS calibration device and the thrust line or center line of the vehicle. Herein, the center axis of the ADAS calibration device refers to a straight line perpendicular to the center line of the ADAS calibration device, or the center axis of the ADAS calibration device refers to a straight line passing through the center point of the ADAS calibration device and parallel to the thrust line or center line of the vehicle. Taking a distance from the ADAS calibration device to the head of the vehicle as an example of the distance D in FIG. 4g, any of the distances described in FIGS. 4b to 4f may be adapted to the position information as described in FIG. 4g in conjunction with the angle and distance mentioned above. Further, the position information may include relative height information.

In step 303, the user equipment provides a position adjustment scheme for the ADAS calibration device relative to the vehicle according to the position information, so that a user positions the ADAS calibration device to a preset position relative to the vehicle according to the position adjustment scheme.

In some embodiments, the user equipment determines the position adjustment scheme for the ADAS calibration device by comparing a current distance from the ADAS calibration device to the vehicle with a distance to the preset position according to the position information determined in step 302. Herein, the preset position is related to vehicle models, or a position of a system or sensor to be calibrated on the vehicle.

In some embodiments, the user equipment may provide a selection interface where vehicle models to be tested or sensors to be tested are offered; the user selects a vehicle model to be tested or a sensor to be tested from the options provided in the interface; the user equipment may determine a preset position corresponding to the selected vehicle model to be tested or the sensor to be tested, and then compare the same with the position information determined in step 302 to determine the position adjustment scheme.

In some embodiments, the position adjustment scheme provided by the user equipment is dynamic, that is, the user equipment determines the position information of the ADAS calibration device relative to the vehicle in real-time according to step 302, and the user equipment determines the position adjustment scheme in real-time and displays to the user in real-time; in this way, the user can adjust timely the positioning mode according to the dynamic position adjustment scheme during the process of adjusting the positioning of the ADAS calibration device.

In some embodiments, the position adjustment scheme provided by the user equipment is non-dynamic, that is, the position adjustment scheme is provided only once, and the user positions the ADAS calibration device according to the position adjustment scheme; a confirmation procedure may be triggered after the adjustment to determine whether the ADAS calibration device is positioned properly; if not, another position adjustment scheme as described above is offered, and the procedure keeps so until the ADAS calibration device is confirmed to be positioned properly.

In some embodiments, the position adjustment scheme includes an adjustment of the height of the ADAS calibration device, for example, an adjustment of a height of a base of the ADAS calibration device, or an adjustment of a height of the crossbeam of the ADAS calibration device relative to the stand; alternatively, the height of the ADAS calibration device relative to the vehicle may be taken as a compensation parameter to determine the position adjustment scheme for the ADAS calibration device.

The position adjustment scheme provided by the user equipment may be displayed to the user via a user interaction interface. As to a specific form of displaying the position adjustment scheme on the user interaction interface, reference can be made to the description in the embodiments below.

Optionally, the method described in the embodiments of the present application further includes:

step A1, receiving a viewing instruction from a user by the user equipment and displaying the relevant image of the vehicle indicated by the viewing instruction.

Specifically, the user may trigger the viewing instruction by clicking, touching, or otherwise the user equipment; upon receiving the viewing instruction, the user equipment displays the relevant image of the vehicle indicated by the viewing instruction.

The implementation of step A1 will now be described by way of example with reference to FIGS. 5a to 5c.

Figure 5A:
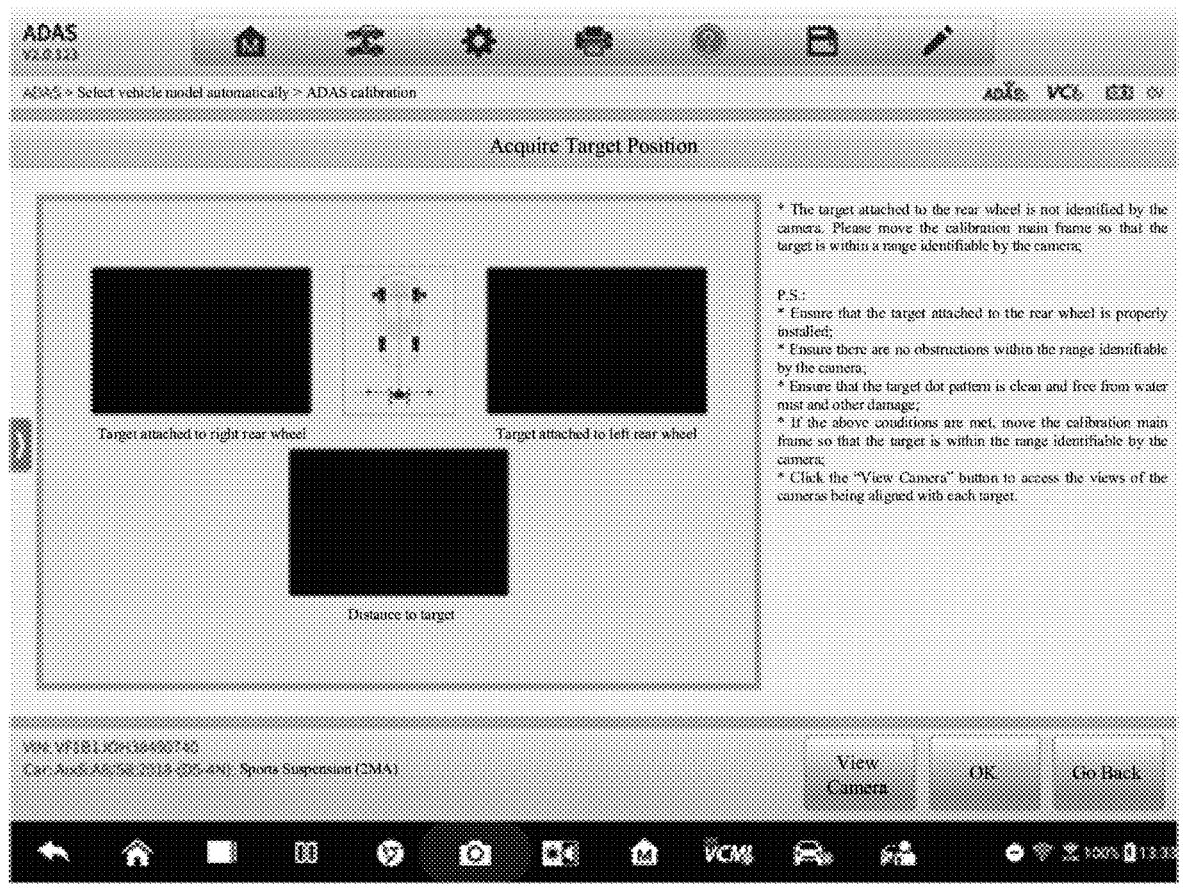
FIG. 5a is a schematic diagram of a first interface interaction for viewing an image of a target according to an embodiment of the present application.
Figure 5B:
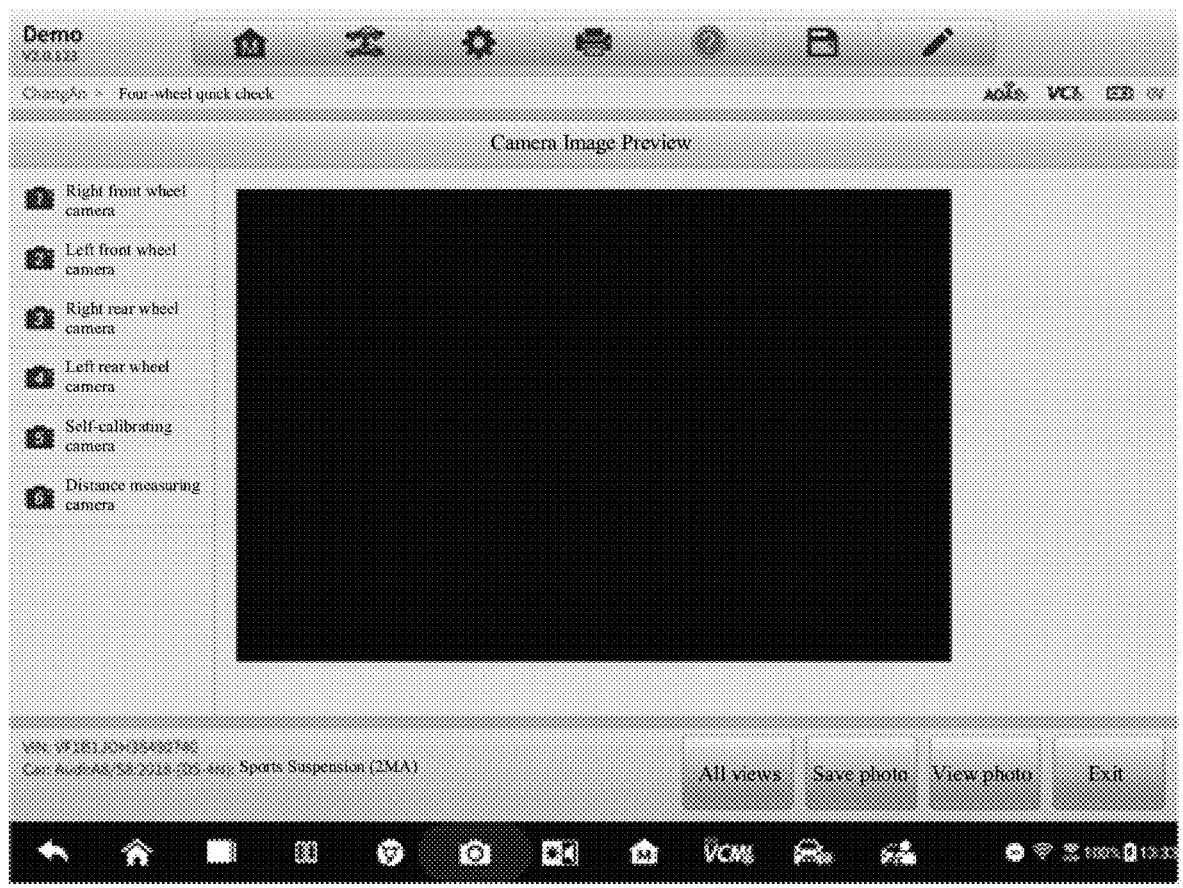
FIG. 5b is a schematic diagram of a second interface interaction for viewing an image of a target according to an embodiment of the present application.

Specifically, the user may click on a "View Camera" button in the interface shown in FIG. 5a, after this, the user can jump to the "Camera Image Preview" page shown in FIG. 5b, and the user can further click on each camera on the left to select a specific camera image, thereby obtaining an image of each camera.

Figure 5C:
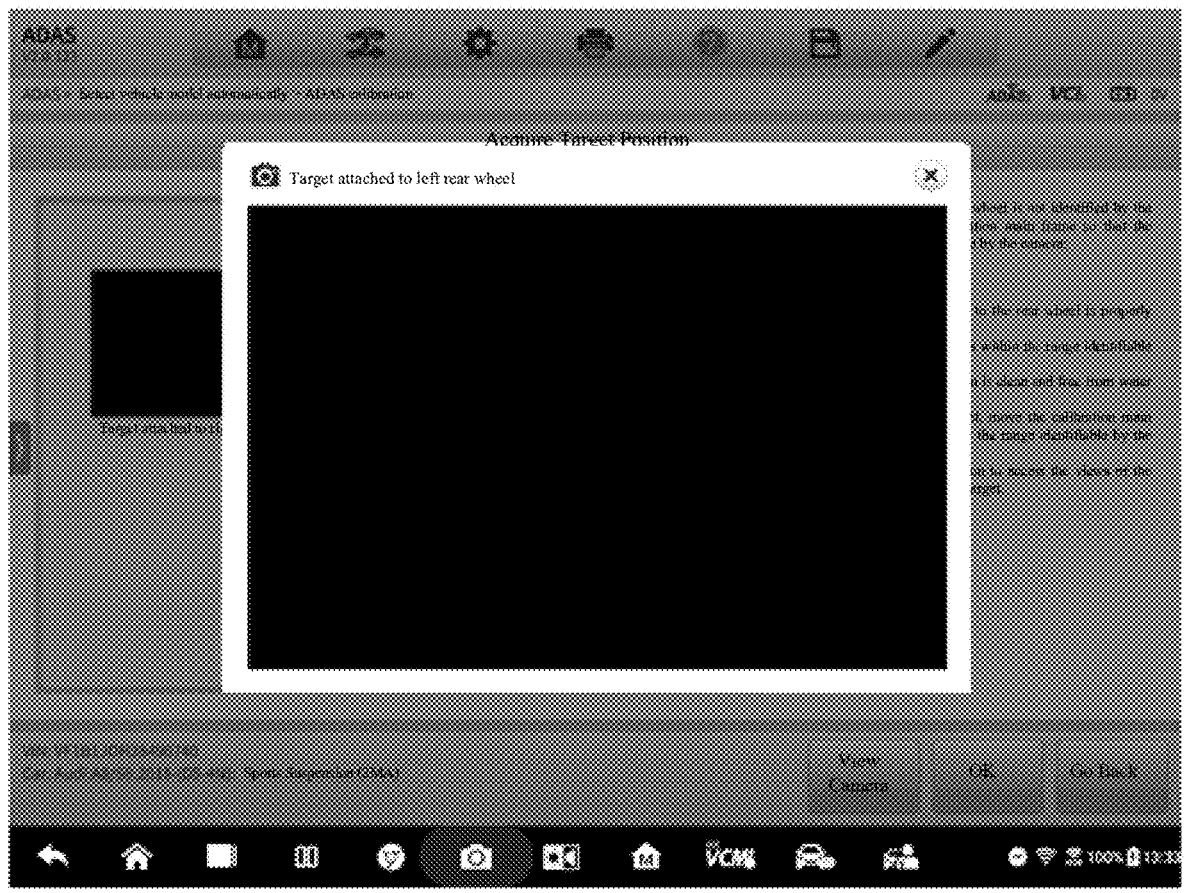
FIG. 5c is a schematic diagram of a third interface interaction schematic for viewing an image of a target according to an embodiment of the present application.

Alternatively, the user may click on a displayed-image box in the interface shown in FIG. 5a, after this, the user jumps to a specific image shown in FIG. 5c, thereby obtaining an image of each camera.

Step A1 may be implemented in a process in which the user equipment provides a position adjustment scheme so that the user can conveniently view relevant images of the vehicle to assist in position adjustment of the ADAS calibration device.

Optionally, the method described in the embodiments of the present application further includes:

step B1, displaying a user operation guide by the user equipment, thereby guiding a user in moving the ADAS calibration device.

In some embodiments, the user operation guide displayed by the user equipment may guide operations desirable for the user when positioning the ADAS calibration device and facilitate the user's understanding of the norms of movement of the ADAS calibration device and precautions during the movement.

Different user operation guides may be provided for different stages in positioning the ADAS calibration device, so as to guide the user operation in different stages. It is possible that different parts of the ADAS calibration device are adjusted for different stages.

As to an implementation of the user operation guide on the user interaction interface, reference may be made to the description in the embodiments below.

According to the present application, a user equipment obtains a relevant image of a vehicle acquired by an image acquisition assembly of an ADAS calibration device, the user equipment determines position information of the ADAS calibration device relative to the vehicle according to the relevant image of the vehicle, and the user equipment provides a position adjustment scheme for the ADAS calibration device relative to the vehicle according to the position information, so that a user positions the ADAS calibration device to a preset position relative to the vehicle according to the position adjustment scheme. The user needs only to position the ADAS calibration device to the preset position according to the adjustment scheme provided by the user equipment, without manual calculation of specific positioning parameters; otherwise, errors are inevitable, and the user has to determine by himself/herself in which direction the device is to be adjusted, which results in low accuracy of positioning and repetitive operations. Through the positioning solution herein, the process of positioning the ADAS calibration device is streamlined, and the positioning efficiency and calibration accuracy are improved.

In positioning the ADAS calibration device, steps S301 to S303 may be repeated. Steps S301 to S303 may also be applied to different stages of positioning the ADAS calibration device. The application of steps S301 to S303 in the process of positioning the ADAS calibration device will now be described below with reference to the accompanying drawings.

In a case where the ADAS calibration device needs to be moved to the vicinity of the vehicle for positioning, that is, the ADAS calibration device is far away from the vehicle, there may be a situation where the image acquisition assembly of the ADAS calibration device is unable to acquire an image of a vehicle target or does not acquire images of all the targets attached to the vehicle. Therefore, the position information of the ADAS calibration device relative to the vehicle can first be determined according to the image of the target, specifically, the user equipment evaluates whether the relevant image of the vehicle includes the image of the target attached to the vehicle; if not, the user equipment determines that the position information of the ADAS calibration device relative to the vehicle is not within a preset range; if so, the user equipment conducts recognition of the relevant image of the vehicle through image recognition technology, to identify a number of targets contained in the relevant image of the vehicle and evaluate whether the number of targets contained in the relevant image of the vehicle reaches a preset number; if not, the user equipment determines that the position information of the ADAS calibration device relative to the vehicle is not within the preset range; if so, the user equipment determines that the position information of the ADAS calibration device relative to the vehicle is within the preset range. Here, the preset range refers to a range, in front of or behind the vehicle, in which an image of a target of the vehicle can be acquired, etc.

An embodiment of the user equipment in this case is further described below in connection with FIG. 5a.

In this embodiment, upon obtaining the relevant image of the vehicle through clicking and viewing, the user equipment identifies whether the relevant image contains an image of a target attached to the rear wheel; if the relevant image does not contain the image of the target attached to the rear wheel, or the number of targets contained therein does not reach the preset number, the user equipment determines that the user needs to move the ADAS calibration so that the targets are within a range identifiable by the camera; at this time, the position adjustment scheme is prompting, by the user equipment, the user to move the ADAS calibration device so that the target is within the range identifiable by the image acquisition assembly, i.e., the camera. When the user is prompted to move the ADAS calibration device, the user can be simultaneously reminded of the precautions for the target and camera, for example, to ensure that the target attached to the rear wheel is properly installed, there are no obstructions within the range identifiable by the camera, and the target dot pattern is clean and free from water mist and other damage. If the camera or target does not meet the conditions specified in the precautions, the user can make corresponding adjustments; for example, if the target is not installed properly, the user can re-install the target. If both the camera and the target meet the conditions, the user can move the ADAS calibration device so that the target is within a range identifiable by the camera. here, the target in this embodiment may include targets attached to the rear wheels, front wheels, and the head or tail of the vehicle.

In another case, the ADAS calibration device needs to be located at a preset distance from the vehicle. In this case, if the relevant image of the vehicle includes an image of a first target attached to the head or tail of the vehicle or as described in any of the situations of FIGS. 4a to 4f, the image of the first target can be acquired by the first camera in the image acquisition assembly, and the user equipment determines a first distance from the ADAS calibration device to the head or tail of the vehicle according to the image of the first target, where the first distance is determined as a distance between the first target attached to the head or tail of the vehicle and the first camera.

Figure 4H:
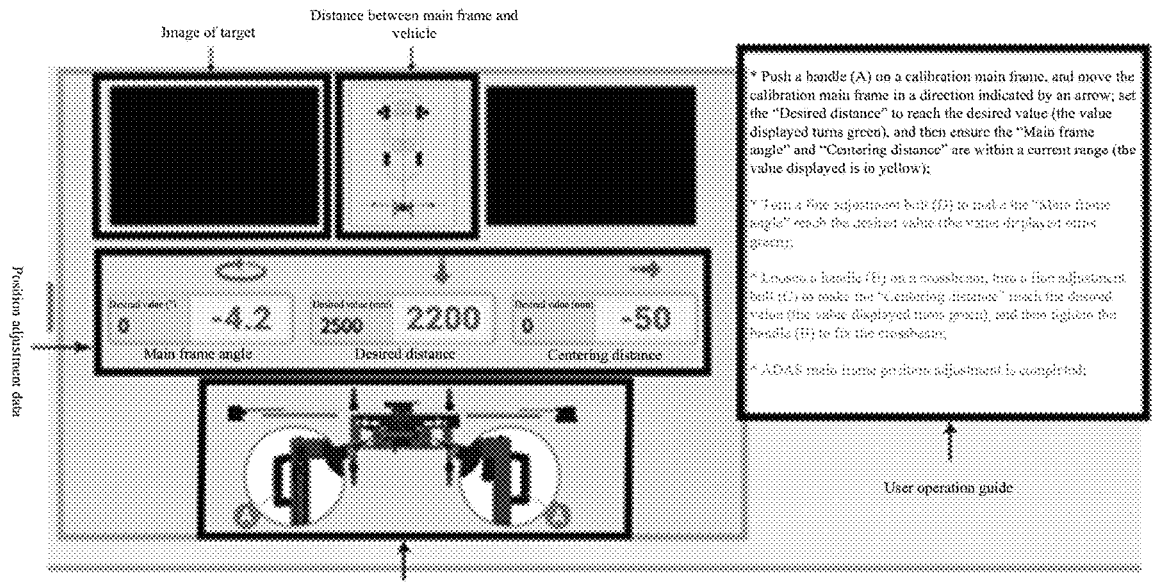
FIG. 4h is a schematic diagram of a first interface interaction for adjusting the ADAS calibration device according to an embodiment of the present application.
Figure 4I:
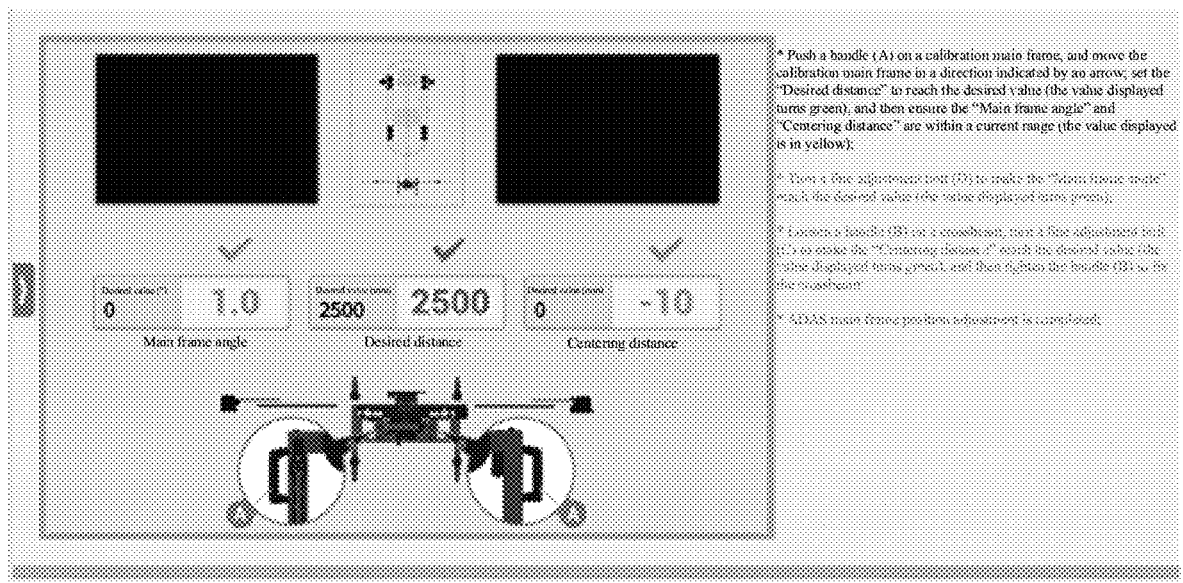
FIG. 4i is a schematic diagram of a second interface interaction for adjusting the ADAS calibration device according to an embodiment of the present application.
Figure 4J:
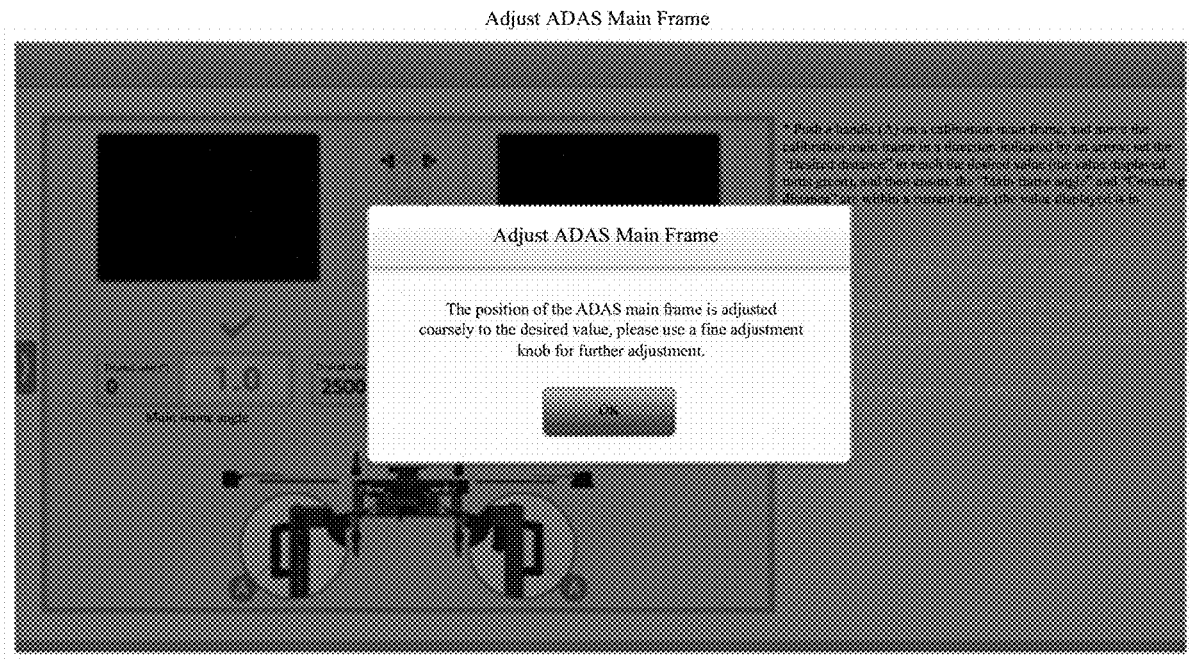
FIG. 4j is a schematic diagram of a third interface interaction for adjusting the ADAS calibration device according to an embodiment of the present application.

In this embodiment, if the relevant image of the vehicle includes the image of the first target, the user equipment determines, according to the image of the first target, the first distance from the ADAS calibration to the head or tail of the vehicle; with reference to FIG. 4g, the first distance from the ADAS calibration device to the vehicle is a distance D from the ADAS calibration device to the head of the vehicle in FIG. 4g, and the user equipment provides position adjustment information of the ADAS calibration device relative to the vehicle according to the distance D and a preset first desired distance. The position adjustment information provide herein includes a first to-be-adjusted distance calculated according to the distance D and the preset first desired distance and an operation guide for the user to adjust the first to-be-adjusted distance, and the position adjustment information may be provided in audios, texts, and a combination of texts and pictures. As to the situation where the position adjustment information is provided in a combination of texts and pictures, reference is made to FIG. 4h specifically. In FIG. 4h, an image of a target, a distance between a main frame of an ADAS calibration device and a vehicle, and position adjustment data (i.e., a to-be-adjusted distance), top and bottom views of a main frame of the ADAS calibration device are provided on the right side orderly, and a user operation guide is provided on the left side, so that the user can intuitively learn the position adjustment scheme. After the position adjustment scheme is provided, the user can then adjust the distance of the ADAS calibration device according to the position adjustment scheme; in the process of adjusting the distance of the ADAS calibration device by the user, a specific distance by which the user adjusts the distance of the ADAS calibration device relative to the vehicle can be detected in real-time. If the distance by which the user adjusts the distance of the ADAS calibration device relative to the vehicle is detected to be equal to the to-be-adjusted distance, that is, the adjusted distance is equal to a desired value, the page provided can be updated in real-time, so as to prompt the user that a coarse adjustment of the first distance is completed; at this moment, as to the manner of displaying the prompt to the user that the coarse adjustment of the first distance is completed, reference can be made to FIG. 4*i*. After this, a prompt that the user shall perform the fine adjustment of the first distance is provided, and as to the manner of displaying the prompt, reference can be made to FIG. 4*j*; thus, the user is informed that the coarse adjustment of the first distance is completed, and the fine adjustment operation is to be done.

In yet another case, the ADAS calibration device needs to be positioned at a preset angle relative to the vehicle. In this case, if the relevant image of the vehicle includes an image of a second target attached to wheels on both sides of the vehicle, the image of the second target is acquired by a second camera assembly in the image acquisition assembly, where the second camera assembly includes two camera modules, of which the field respectively covers the second target of the wheels on both sides of the vehicle, and the user equipment determines the thrust line of the vehicle according to the image of the second target; the user equipment determines an angle of the center line of the ADAS calibration device relative to the thrust line, and the center line of the ADAS calibration device refers to a straight line passing through the two camera modules.

Figure 4K:
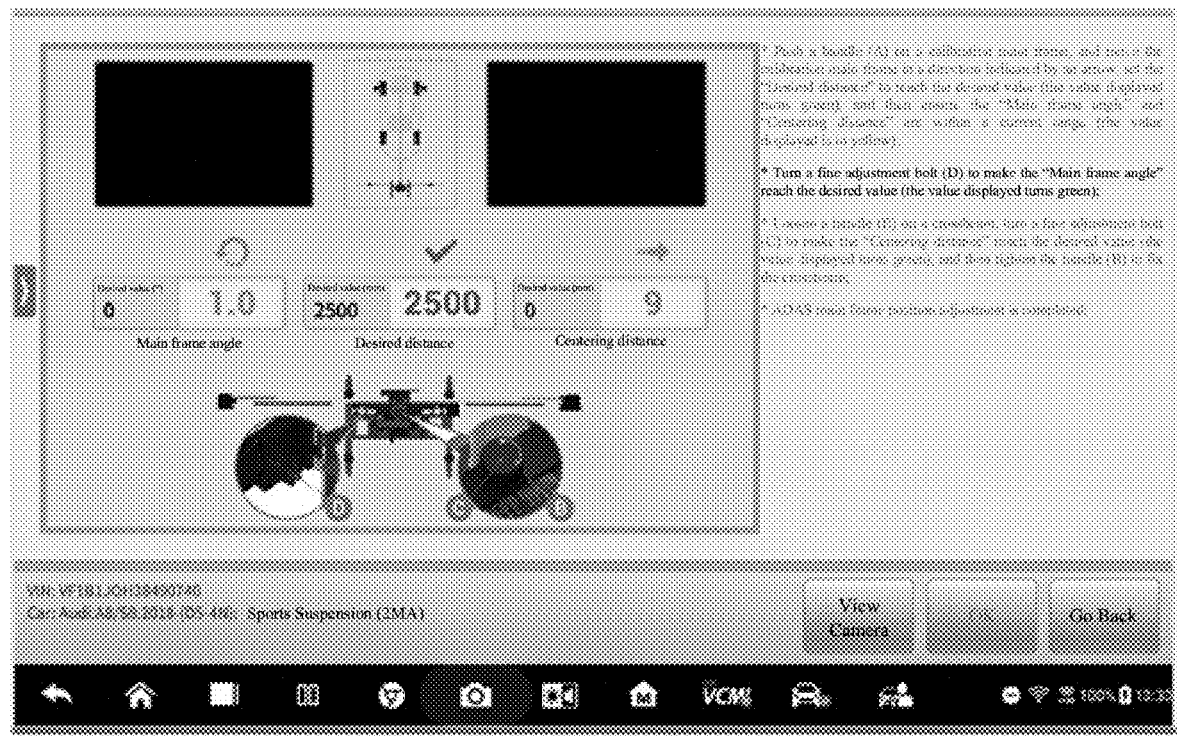
FIG. 4k is a schematic diagram of a fourth interface interaction for adjusting the ADAS calibration device according to an embodiment of the present application.
Figure 4L:
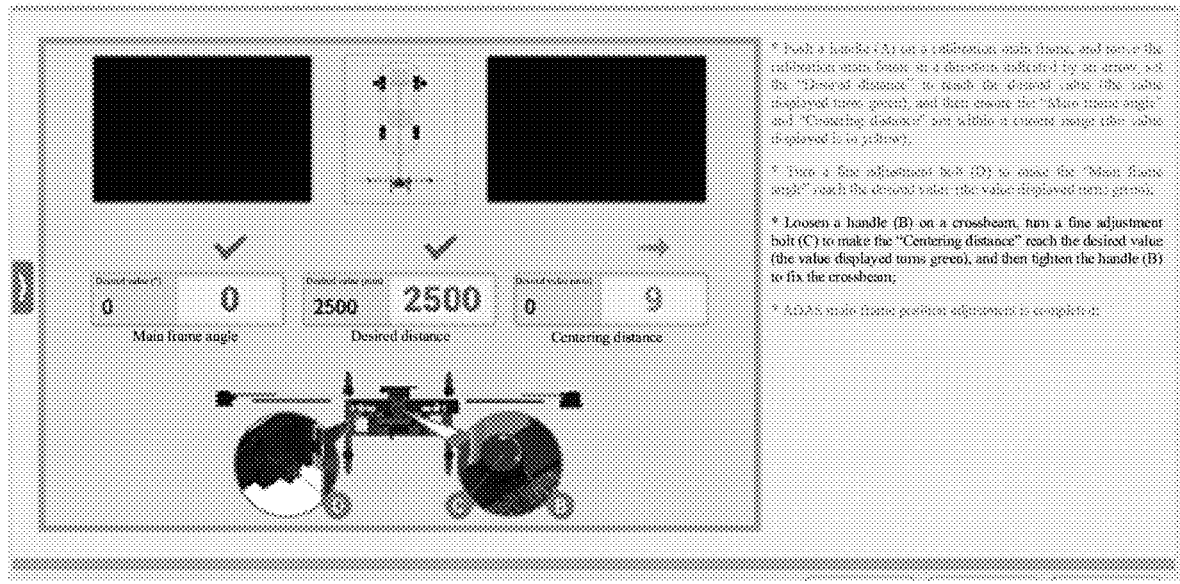
FIG. 4l is a schematic diagram of a fifth interface interaction for adjusting the ADAS calibration device according to an embodiment of the present application.

In this embodiment, if the relevant image of the vehicle includes the image of the second target, the user equipment determines the thrust line of the vehicle according to the image of the second target; further, the user equipment determines the angle of the center line of the ADAS calibration device relative to the thrust line; as shown in FIG. 4*g*, the angle of the center line of the ADAS calibration device relative to the thrust line is an angle (90°−θ) included between the center line of the ADAS calibration device and the thrust line or center line of the vehicle in FIG. 4*g*; the user equipment calculates a to-be-adjusted angle according to the angle and a preset desired angle, and provides a position adjustment scheme for the ADAS calibration device relative to the vehicle according to the to-be-adjusted angle, where the position adjustment scheme may include the to-be-adjusted angle and a corresponding user operation guide for angle adjustment. Here, the angle adjustment may be performed before the adjustment of the first distance is completed, or may be performed after the adjustment of the first distance, which is not limited herein. If the angle adjustment is performed after the adjustment of the first distance is completed, reference can be made to FIG. 4*k* for a specific manner of providing a position adjustment scheme involving the angle. After the position adjustment scheme is provided, the user can then adjust the angle of the ADAS calibration device according to the position adjustment scheme; in the process of the user adjusting the angle of the ADAS calibration device, a specific angle by which the user adjusts the angle of the ADAS calibration device relative to the vehicle can be detected in real-time. If the angle by which the user adjusts the angle of the ADAS calibration device relative to the vehicle is detected to be equal to the to-be-adjusted angle, that is, the adjusted angle is equal to the desired value, the page provided can be updated in real-time to prompt the user that the angle adjustment is completed; as to the manner of displaying the prompt to the user that the angle adjustment is completed, reference may be made to FIG. 4*l*; thus, the user is informed that the angle adjustment is completed, and the next operation is to be done.

In a case, the center of the ADAS calibration device needs to be aligned with the center line or thrust line of the vehicle. In this case, if the relevant image of the vehicle includes an image of a second target attached to wheels on both sides of the vehicle, the image of the second target is acquired by a second camera assembly in the image acquisition assembly, where the second camera assembly includes two camera modules, of which the field respectively covers the second target of the wheels on both sides of the vehicle, and the user equipment determines the thrust line of the vehicle according to the image of the second target; the user equipment determines a second distance from a center point of the ADAS calibration device to an intersection point of the thrust line and a center line of the ADAS calibration device, and the center line of the ADAS calibration device refers to a straight line passing through two camera modules.

Figure 4M:
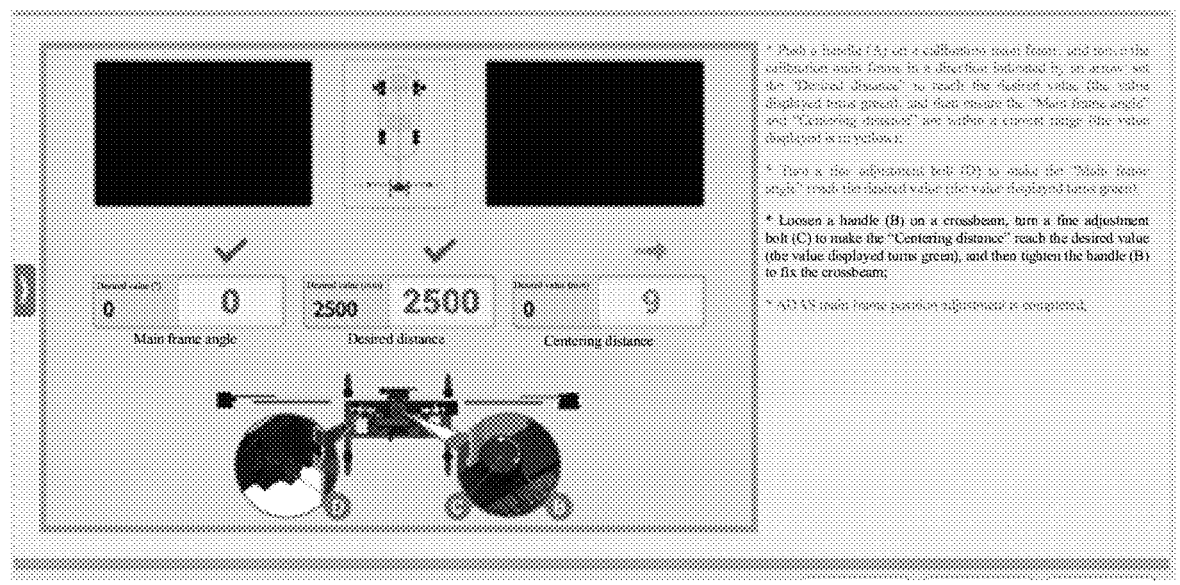
FIG. 4m is a schematic diagram of a sixth interface interaction for adjusting the ADAS calibration device according to an embodiment of the present application.
Figure 4N:
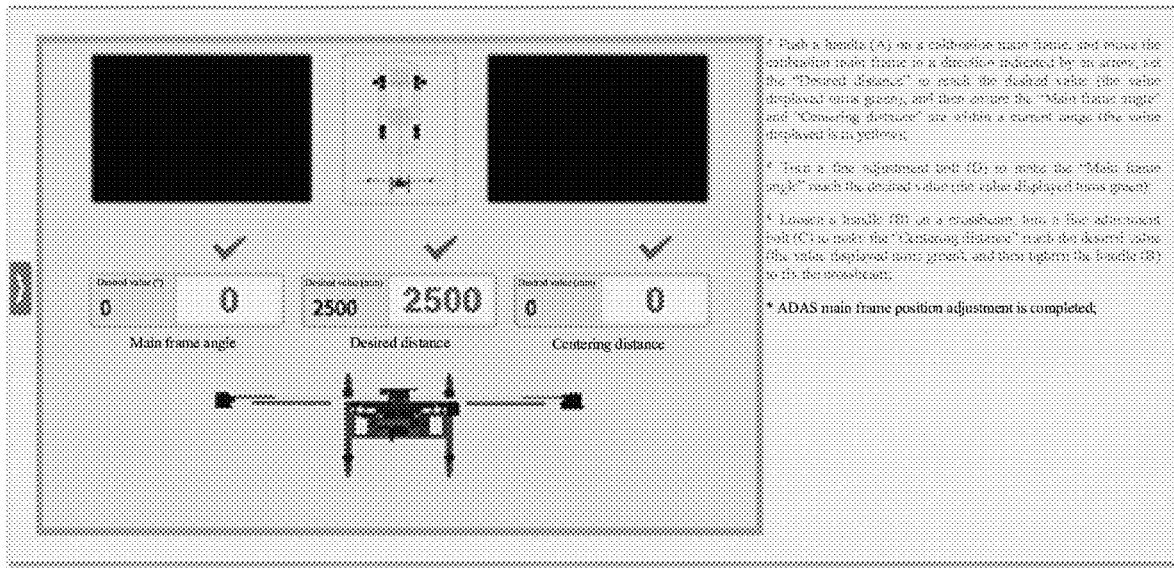
FIG. 4n is a schematic diagram of a seventh interface interaction for adjusting the ADAS calibration device according to an embodiment of the present application.

In this embodiment, if the relevant image of the vehicle includes the image of the second target, the user equipment determines, according to the image of the second target, a perpendicular distance L, i.e., the second distance, from the center point of the ADAS calibration device to the intersection point of the thrust line and the center line of the ADAS calibration device; as shown in FIG. 4*g*, the second distance from the center point of the ADAS calibration device to the intersection point of the thrust line and the center line of the ADAS calibration device is the perpendicular distance L from the center point of the ADAS calibration device to the intersection point of the thrust line and the center line of the ADAS calibration device in FIG. 4*g*, and the user equipment provides a position adjustment scheme for the ADAS calibration device relative to the vehicle according to the second distance and a preset second desired distance. Here, the adjustment of the second distance may be performed before the angle adjustment is completed, or may be performed after the angle adjustment, which is not limited herein. If the adjustment of the second distance is performed after the angle adjustment is completed, reference is made to FIG. 4*m* for a way of specifically providing a position adjustment scheme involving the second distance. After the position adjustment information is provided, the user can then adjust the second distance of the ADAS calibration device according to the position adjustment information; in the process of the user adjusting the second distance of the ADAS calibration device, the specific distance by which the user adjusts the second distance of the ADAS calibration device relative to the vehicle can be detected in real-time. If the distance by which the user adjusts the second distance of the ADAS calibration device relative to the vehicle is detected to be equal to the to-be-adjusted distance, that is, the adjusted distance is equal to the desired value, the page provided can be updated in real-time to prompt the user that the adjustment of the second distance is completed; as to the manner of displaying the prompt to the user that the adjustment of the second distance is completed, reference can be made to FIG. 4*n*; thus, the user is informed that the adjustment of the second distance is completed, and the next operation is to be done.

In a case, a height of the ADAS calibration device needs to be aligned with a height of the vehicle. In this case, the relevant image of the vehicle includes an image of a third target in the plane of the vehicle, and the image of the third target is acquired by a third camera in the image acquisition assembly.

In this embodiment, if the relevant image of the vehicle includes the image of the third target, the user equipment obtains relative height information of the ADAS calibration device relative to the vehicle according to the image of the third target. The relative height information may include a height comparison of the ADAS calibration device with the vehicle, for example, the vehicle is higher than the ADAS calibration device, or the relative height information may include a height difference between the ADAS calibration device and the vehicle. Herein, the relative height between the ADAS calibration device and the vehicle may refer to the height between a support surface of the ADAS calibration device and a support surface of the vehicle, for example, the support surface of the ADAS calibration device is the ground of a location where the calibration is conducted, and the support surface of the vehicle is a plane in which the vehicle is supported by a lifting machine. Alternatively, the relative height between the ADAS calibration device and the vehicle refers to a relative height between the calibration element on the ADAS calibration device and the sensor to be calibrated on the vehicle.

The user equipment provides a position adjustment scheme for the ADAS calibration device relative to the vehicle according to the relative height information; in the process of the user adjusting the height of the ADAS calibration device, a specific height by which the user adjusts the height of the ADAS calibration device relative to the vehicle can be detected in real-time. If the height by which the user adjusts the height of the ADAS calibration device relative to the vehicle is detected to be equal to the to-be-adjusted distance in the relative height information, that is, the adjusted height is equal to the desired value, the page provided can be updated in real-time to prompt the user that the adjustment of the height is completed; thus, the user is informed that the adjustment of the height is completed, and the next operation is to be done.

It should be noted that there is no certain sequence of implementation in each of the cases described above, and these cases serve merely to illustrate how the solution described in the embodiments of the present application is applied in several cases during the process of positioning the ADAS calibration device, and the methods implemented in the cases are independent of one another.

A specific implementation of position adjustment for the ADAS calibration device using embodiments of the present application is described below.

Figure 5D:
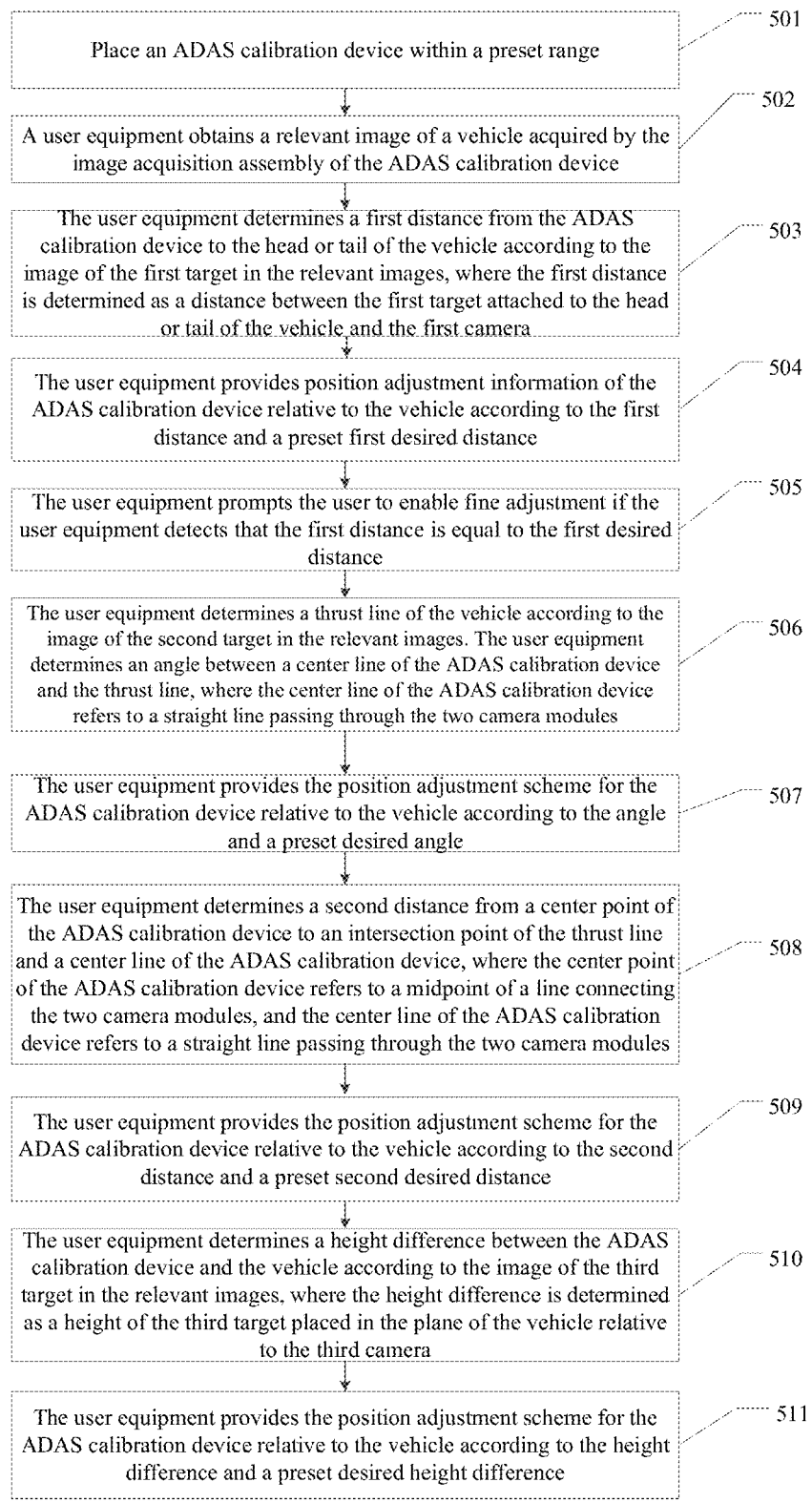
FIG. 5d is a flowchart of a positioning method for an ADAS calibration device according to an embodiment of the present application.

With reference to FIG. 5d, which is a flowchart of a specific implementation of adjusting the ADAS calibration device according to an embodiment of the present application, the implementation specifically includes the steps below.

In step 501, the ADAS calibration device is placed within a preset range.

In this embodiment, the ADAS calibration device is placed within the preset range so that the image acquisition assembly of the ADAS calibration device acquires the relevant image of the vehicle.

In step 502, a user equipment obtains a relevant image of a vehicle acquired by the image acquisition assembly of the ADAS calibration device.

In this embodiment, the relevant image of the vehicle is acquired by the image acquisition assembly of the ADAS calibration device, where the image acquisition assembly may include a plurality of image acquisition assemblies, and the relevant image of the vehicle may include images taken from various perspectives from the vehicle by respective image acquisition assemblies. The user equipment then acquires the relevant image of the vehicle transmitted by the ADAS calibration device, where the user equipment is communicatively connected to the ADAS calibration device for transmission of information such as the relevant image of the vehicle.

For example, referring to FIG. 4a, the relevant image of the vehicle is an image of a target attached to the head of the vehicle. Here, the image of the target attached to the head of the vehicle may be acquired by the image acquisition assembly provided on the crossbeam of the ADAS calibration device. Referring to FIG. 4b, the relevant image of the vehicle is an image of a target attached to a rear wheel. Herein, one target is attached to each of the rear wheels on both sides, the images of the targets attached to the rear wheels on both sides can be respectively acquired by the image acquisition assemblies at both ends of the crossbeam of the ADAS device, and the ADAS calibration device is placed near the tail of the vehicle. Referring to FIG. 4c, the relevant image of the vehicle is an image of a target attached to the front wheel. Here, the target attached to the front wheel may be provided on only one side of the vehicle or both sides of the vehicle. The image of the target attached to the front wheel is acquired by one or both of the image acquisition assemblies at both ends of the crossbeam of the ADAS calibration device. Referring to FIG. 4d, the relevant image of the vehicle is an image of a target in the plane as of the front radar provided at the head of the vehicle. Here, the target in the plane of the front radar may be provided on only one side of the vehicle or both sides of the vehicle. The image of the targets in the plane of the front radar is acquired by one or both of the image acquisition assemblies at both ends of the crossbeam of the ADAS calibration device. Referring to FIG. 4e, the relevant image of the vehicle is an image of a target attached to the rearview mirror. Here, the target attached to the rearview mirror may be provided on only one side of the vehicle or both sides of the vehicle. The image of the target attached to the rearview mirror is acquired by one or both of the image acquisition assemblies at both ends of the crossbeam of the ADAS calibration device. Referring to FIG. 4f, the relevant image of the vehicle is an image of a target in the plane of the head of the vehicle. Here, the image of the target in the plane of the head of the vehicle is acquired by one of the image acquisition assemblies at both ends of the crossbeam of the ADAS calibration device, and the ADAS calibration device is placed at the tail of the vehicle.

In step 503, the user equipment determines determining a first distance from the ADAS calibration device to the head or tail of the vehicle according to the image of the first target in the relevant images, where the first distance is determined as a distance between the first target attached to the head or tail of the vehicle and the first camera.

Herein, the image of the first target is an image of a target attached to the head or tail of the vehicle, and at this time, the user equipment determines the first distance of the ADAS calibration device relative to the head or tail of the vehicle according to the image of the first target; in FIG. 4a, the first distance is determined as a distance between the first target attached to the head or tail of the vehicle and the first camera, that is, the position information of the ADAS calibration device relative to the vehicle includes distance information of the ADAS calibration device relative to the head of the vehicle, or is determined from the positional relationship between the target attached to the head and the image acquisition assembly in conjunction with the positional relationship between the image acquisition assembly and the center line of the ADAS calibration device.

In step 504, the user equipment provides position adjustment information of the ADAS calibration device relative to the vehicle according to the first distance and a preset first desired distance.

In step 505, the user equipment prompts the user to enable fine adjustment if the user equipment detects that the first distance is equal to the first desired distance.

With reference to FIG. 4g, the first distance from the ADAS calibration device to the vehicle is a distance D from the ADAS calibration device to the head of the vehicle in FIG. 4g, and the user equipment provides position adjustment information of the ADAS calibration device relative to the vehicle according to the distance D and a preset first desired distance. The position adjustment information provide herein includes a first to-be-adjusted distance calculated according to the distance D and the preset first desired distance and an operation guide for the user to adjust the first to-be-adjusted distance, and the position adjustment information may be provided in audios, texts, and a combination of texts and pictures. As to the situation where the position adjustment information is provided in a combination of texts and pictures, reference is made to FIG. 4h specifically. After the position adjustment scheme is provided, the user can then adjust the distance of the ADAS calibration device according to the position adjustment scheme; in the process of adjusting the distance of the ADAS calibration device by the user, a specific distance by which the user adjusts the distance of the ADAS calibration device relative to the vehicle can be detected in real-time. If the distance by which the user adjusts the distance of the ADAS calibration device relative to the vehicle is detected to be equal to the to-be-adjusted distance, that is, the adjusted distance is equal to a desired value, the page provided can be updated in real-time, so as to prompt the user that a coarse adjustment of the first distance is completed; at this moment, as to the manner of displaying the prompt to the user that the coarse adjustment of the first distance is completed, reference can be made to FIG. 4i. After this, a prompt that the user shall perform the fine adjustment of the first distance is provided, and as to the manner of displaying the prompt, reference can be made to FIG. 4j; thus, the user is informed that the coarse adjustment of the first distance is completed, and the fine adjustment operation is to be done.

In step 506, the user equipment determines a thrust line of the vehicle according to the image of the second target in the relevant images. The user equipment determines an angle between a center line of the ADAS calibration device and the thrust line, where the center line of the ADAS calibration device refers to a straight line passing through the two camera modules.

Herein, the image of the second target is the image of the second target attached to wheels on both sides of the vehicle, and the user equipment determines the thrust line of the vehicle according to the image of the second target and the angle of the center line of the ADAS calibration device relative to the thrust line, where the center line of the ADAS calibration device refers to a straight line passing through the two camera modules.

In step 507, the user equipment provides the position adjustment scheme for the ADAS calibration device relative to the vehicle according to the angle and a preset desired angle.

The user equipment calculates a to-be-adjusted angle of the ADAS calibration device relative to the vehicle according to an angle of the center line of the ADAS calibration device relative to the thrust line and a preset desired angle, and provides the to-be-adjusted angle as a position adjustment scheme. Further, the position adjustment scheme may include, in addition to the to-be-adjusted angle, a user operation guide for the user to adjust the angle, so as to guide the adjustment of the ADAS calibration device by the user. As shown in FIG. 4g, the angle of the center line of the ADAS calibration device relative to the thrust line is an angle (90°−θ) included between the center line of the ADAS calibration device and the thrust line or center line of the vehicle in FIG. 4g; the user equipment calculates the to-be-adjusted angle according to the angle and the preset desired angle, and provides a position adjustment scheme for the ADAS calibration device relative to the vehicle according to the to-be-adjusted angle, where the position adjustment scheme may include the to-be-adjusted angle and a corresponding user operation guide for angle adjustment. Here, the angle adjustment may be performed before the adjustment of the first distance is completed, or may be performed after the adjustment of the first distance, which is not limited herein. If the angle adjustment is performed after the adjustment of the first distance is completed, reference can be made to FIG. 4k for a specific manner of providing a position adjustment scheme involving the angle. After the position adjustment scheme is provided, the user can then adjust the angle of the ADAS calibration device according to the position adjustment scheme; in the process of the user adjusting the angle of the ADAS calibration device, a specific angle by which the user adjusts the angle of the ADAS calibration device relative to the vehicle can be detected in real-time. If the angle by which the user adjusts the angle of the ADAS calibration device relative to the vehicle is detected to be equal to the to-be-adjusted angle, that is, the adjusted angle is equal to the desired value, the page provided can be updated in real-time to prompt the user that the angle adjustment is completed; as to the manner of displaying the prompt to the user that the angle adjustment is completed, reference may be made to FIG. 4l; thus, the user is informed that the angle adjustment is completed, and the next operation is to be done.

In step 508, the user equipment determines a second distance from a center point of the ADAS calibration device to an intersection point of the thrust line and a center line of the ADAS calibration device, where the center point of the ADAS calibration device refers to a midpoint of a line connecting the two camera modules, and the center line of the ADAS calibration device refers to a straight line passing through the two camera modules.

Further, the user equipment determines a second distance from a center point of the ADAS calibration device to an intersection point of the thrust line and a center line of the ADAS calibration device, where the center point of the ADAS calibration device refers to a midpoint of a line connecting the two camera modules, and the center line of the ADAS calibration device refers to a straight line passing through the two camera modules.

In step 509, the user equipment provides the position adjustment scheme for the ADAS calibration device relative to the vehicle according to the second distance and a preset second desired distance.

After determining the second distance from the center point of the ADAS calibration device to an intersection point of the thrust line and the center line of the ADAS calibration device, the user equipment compares the second distance with the preset second desired distance to obtain a second to-be-adjusted distance of the ADAS calibration device relative to the vehicle, and provides the second to-be-adjusted distance as a position adjustment scheme. Further, the position adjustment scheme may include, in addition to the second to-be-adjusted distance, a user operation guide for adjusting the distance, thereby guiding the adjustment of the ADAS calibration device by the user.

As shown in FIG. 4g, the second distance from the center point of the ADAS calibration device to the intersection point of the thrust line and the center line of the ADAS calibration device is the perpendicular distance L from the center point of the ADAS calibration device to the intersection point of the thrust line and the center line of the ADAS calibration device in FIG. 4g, and the user equipment provides a position adjustment scheme for the ADAS calibration device relative to the vehicle according to the second distance and a preset second desired distance. Here, the adjustment of the second distance may be performed before the angle adjustment is completed, or may be performed after the angle adjustment, which is not limited herein. If the adjustment of the second distance is performed after the angle adjustment is completed, reference is made to FIG. 4m for a way of specifically providing a position adjustment scheme involving the second distance. After the position adjustment information is provided, the user can then adjust the second distance of the ADAS calibration device according to the position adjustment information; in the process of the user adjusting the second distance of the ADAS calibration device, the specific distance by which the user adjusts the second distance of the ADAS calibration device relative to the vehicle can be detected in real-time. If the distance by which the user adjusts the second distance of the ADAS calibration device relative to the vehicle is detected to be equal to the to-be-adjusted distance, that is, the adjusted distance is equal to the desired value, the page provided can be updated in real-time to prompt the user that the adjustment of the second distance is completed; as to the manner of displaying the prompt to the user that the adjustment of the second distance is completed, reference can be made to FIG. 4n; thus, the user is informed that the adjustment of the second distance is completed, and the next operation is to be done.

In step 510, the user equipment determines a height difference between the ADAS calibration device and the vehicle according to the image of the third target in the relevant images, where the height difference is determined as a height of the third target placed in the plane of the vehicle relative to the third camera.

The user equipment determines the height difference between the ADAS calibration device and the vehicle according to the image of the third target, where the height difference is determined as the height of the third target placed in the plane of the vehicle relative to the third camera.

In step 511, the user equipment provides the position adjustment scheme for the ADAS calibration device relative to the vehicle according to the height difference and a preset desired height difference.

The user equipment determines the height difference between the ADAS calibration device and the vehicle according to the image of the third target, calculates a to-be-adjusted height difference of the ADAS calibration device relative to the vehicle according to the height difference and the preset desired height difference, and provides the to-be-adjusted height as a position adjustment scheme. Further, the position adjustment scheme may include, in addition to the to-be-adjusted height, a user operation guide for adjusting the height, so as to guide the adjustment of the ADAS calibration device by the user.

It should be noted that the steps described above may be combined otherwise to adjust the position of the ADAS calibration device, and the process shown in the embodiments above is merely an example. For example, in other combinations, steps 508 and 509 may be performed prior to steps 506 and 507. In some embodiments, steps 510 and 511 may be omitted.

To facilitate the implementation of the above method, embodiments of the present application may also provide a positioning apparatus for an ADAS calibration device.

Figure 6:
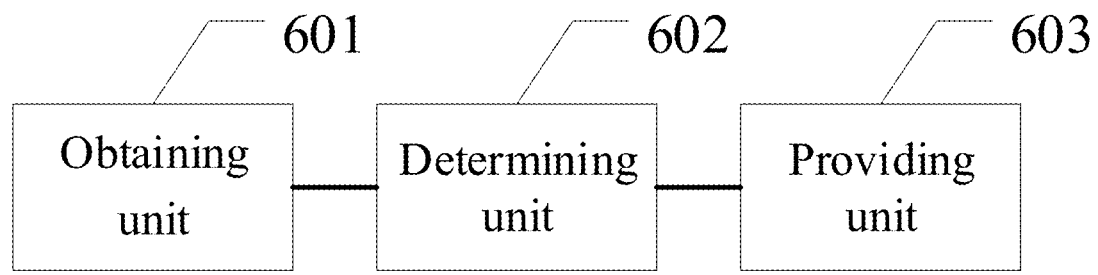
FIG. 6 is a schematic diagram showing a structure of an ADAS main frame calibration apparatus according to an embodiment of the present application.

For example, as shown in FIG. 6, the positioning apparatus for an ADAS calibration device may include an obtaining unit 601, a determining unit 602, and a providing unit 603, which are described as follows.

(1) Obtaining Unit 601

The obtaining unit 601 is configured for the user equipment to obtain a relevant image of a vehicle acquired by the image acquisition assembly of the ADAS calibration device;

In this embodiment, the relevant image of the vehicle is acquired by the image acquisition assembly of the ADAS calibration device, where the image acquisition assembly may include a plurality of image acquisition assemblies, and the relevant image of the vehicle may include images taken from various perspectives from the vehicle by respective image acquisition assemblies. The user equipment then acquires the relevant image of the vehicle transmitted by the ADAS calibration device, where the user equipment is communicatively connected to the ADAS calibration device for transmission of information such as the relevant image of the vehicle.

(2) Determining Unit 602

The determining unit 602 is configured for the user equipment to determine position information of the ADAS calibration device relative to the vehicle according to the relevant image of the vehicle.

After acquiring the relevant image of the vehicle, the user equipment may determine the position information of the ADAS calibration device relative to the vehicle according to the relevant image of the vehicle.

(3) Providing Unit 603

The providing unit 603 is configured for the user equipment to provide a position adjustment scheme for the ADAS calibration device relative to the vehicle according to the position information, so that a user positions the ADAS calibration device to a preset position relative to the vehicle according to the position adjustment scheme.

After obtaining the position information through calculation, the user equipment provides the position adjustment scheme for the ADAS calibration device relative to the vehicle according to the position information, so that the user positions the ADAS calibration device to the preset position relative to the vehicle according to the position adjustment scheme. Here, providing the position adjustment scheme for the ADAS calibration device relative to the vehicle may include indicating by what a distance or angle the ADAS calibration device is to be moved by the user relative to the vehicle, or prompting the user to adjust the height of the ADAS calibration device itself, etc. The details of the adjustment may be provided in audios, texts, or a combination of texts and pictures, etc.

It can be seen from the above that the positioning apparatus for an ADAS calibration device of this embodiment acquires the relevant image of the vehicle acquired by the image acquisition assembly of the ADAS calibration device through the obtaining unit 601 of the user equipment; the user equipment determines the position information of the ADAS calibration device relative to the vehicle according to the relevant image of the vehicle through the determining unit 502; the user equipment provides the position adjustment scheme for the ADAS calibration device relative to the vehicle through the providing unit 603, so that the user positions the ADAS calibration device to the preset position relative to the vehicle according to the position adjustment scheme. As such, the user can position the ADAS calibration device only according to the position adjustment scheme, without having to learn from and refer to other materials, which reduces the steps and time for positioning the ADAS calibration device, improves the efficiency of positioning the ADAS calibration device, and renders a better user experience.

It will be appreciated by those of ordinary skill in the art that all or some of the steps in the various methods of the above embodiments may be performed by instructions, or by relevant hardware controlled by the instructions, and the instructions may be stored in a computer-readable storage medium and loaded and executed by a processor.

To this end, embodiments of the present application provide a computer-readable storage medium having stored therein a plurality of instructions capable of being loaded by a processor to perform steps in any positioning method for an ADAS calibration device provided in the embodiments of the present application. For example, the instructions may perform the steps of:

obtaining a relevant image of a vehicle acquired by the image acquisition assembly of the ADAS calibration device by the user equipment;

determining position information of the ADAS calibration device relative to the vehicle according to the relevant image of the vehicle by the user equipment; and providing a position adjustment scheme for the ADAS calibration device relative to the vehicle according to the position information by the user equipment, so that a user positions the ADAS calibration device to a preset position relative to the vehicle according to the position adjustment scheme.

As to specific implementations of the above operations, reference can be made to the preceding embodiments, and they will not be described in detail herein.

Here, the computer-readable storage medium may include read-only memory (ROM), random access memory (RAM), magnetic or optical disks, etc.

Since the instructions stored in the computer-readable storage medium can cause to perform the steps in any the positioning method for an ADAS calibration device provided in the embodiments of the present application, the advantageous effects achievable by any positioning method for an ADAS calibration device provided in the embodiments of the present application can be achieved, which are described in detail in the preceding embodiments and will not be described in detail herein.

The positioning method, system and apparatus for an ADAS calibration device and a computer-readable storage medium provided in the embodiments of the present application are described in detail above, and the concept and embodiments of the present application are explained herein by way of specific examples. The above description of the embodiments is intended only to facilitate the understanding of the method and the core idea of the present application. Moreover, those skilled in the art, on the basis of the concept of the present application, would be able to make changes to specific embodiments and the application scope. In summary, this description shall not be construed as limiting the present application.

The invention claimed is:

1. A positioning method for an ADAS (Advanced driver assistance systems) calibration device, being applied to an ADAS calibration system, the ADAS calibration system comprising an ADAS calibration device and a user equipment, the ADAS calibration device comprising an image acquisition assembly, the user equipment being communicatively connected to the ADAS calibration device, the method comprising:

obtaining a relevant image of a vehicle acquired by the image acquisition assembly of the ADAS calibration device by the user equipment;

determining position information of the ADAS calibration device relative to the vehicle according to the relevant image of the vehicle by the user equipment; and providing a position adjustment scheme for the ADAS calibration device relative to the vehicle according to the position information by the user equipment, so that a user positions the ADAS calibration device to a preset position relative to the vehicle according to the position adjustment scheme;

wherein the relevant image of the vehicle comprises an image of a second target attached to wheels on both sides of the vehicle, and the image of the second target is acquired by a second camera assembly of the image acquisition assembly, where the second camera assembly comprises two camera modules, and a field of view of the two camera modules respectively covers the second target of the wheels on both sides of the vehicle;

determining position information of the ADAS calibration device relative to the vehicle according to the relevant image of the vehicle by the user equipment comprises: determining a thrust line of the vehicle according to the image of the second target by the user equipment: and determining an angle between a center line of the ADAS calibration device and the thrust line by the user equipment, where the center line of the ADAS calibration device refers to a straight line passing through the two camera modules; wherein providing a position adjustment scheme for the ADAS calibration device relative to the vehicle according to the position information by the user equipment comprises: providing the position adjustment scheme for the ADAS calibration device relative to the vehicle according to the angle and a preset desired angle by the user equipment; or determining position information of the ADAS calibration device relative to the vehicle according to the relevant image of the vehicle by the user equipment comprises: determining a thrust line of the vehicle according to the image of the second target by the user equipment; and determining a second distance from a center point of the ADAS calibration device to an intersection point of the thrust line and a center line of the ADAS calibration device by the user equipment, where the center point of the ADAS calibration device refers to a midpoint of a line connecting the two camera modules, and the center line of the ADAS calibration device refers to a straight line passing through the two camera modules; wherein providing a position adjustment scheme for the ADAS calibration device relative to the vehicle according to the position information by the user equipment comprises: providing the position adjustment scheme for the ADAS calibration device relative to the vehicle according to the second distance and a preset second desired distance by the user equipment.

2. The method according to claim 1, wherein determining position information of the ADAS calibration device relative to the vehicle according to the relevant image of the vehicle by the user equipment comprises:

evaluating whether the relevant image of the vehicle comprises an image of a target attached to the vehicle by the user equipment;

the relevant image of the vehicle doesn't comprise the image of the target attached to the vehicle, determining by the user equipment that the position information of the ADAS calibration device relative to the vehicle is not within a preset range.

3. The method according to claim 2, wherein a number of the target is at least two, and evaluating whether the relevant image of the vehicle comprises an image of a target attached to the vehicle by the user equipment comprises:

evaluating whether the relevant image of the vehicle comprises a preset number of images of the target by the user equipment;

If the relevant image of the vehicle doesn't comprise the preset number of images of the target, determining by the user equipment that the position information of the ADAS calibration device relative to the vehicle is not within the preset range.

4. The method according to claim 2, wherein the position adjustment scheme comprises prompting a user to move the ADAS calibration system into the preset range.

5. The method according to claim 1, wherein the relevant image of the vehicle comprises an image of a first target attached to a head or tail of the vehicle, and the image of the first target is acquired by a first camera in the image acquisition assembly; determining position information of the ADAS calibration device relative to the vehicle according to the relevant image of the vehicle by the user equipment comprises:

determining a first distance from the ADAS calibration device to the head or tail of the vehicle according to the image of the first target by the user equipment, where the first distance is determined as a distance between the first target attached to the head or tail of the vehicle and the first camera.

6. The method according to claim 5, wherein providing a position adjustment scheme for the ADAS calibration device relative to the vehicle according to the position information by the user equipment comprises:

providing position adjustment information of the ADAS calibration device relative to the vehicle according to the first distance and a preset first desired distance by the user equipment.

7. The method according to claim 6, further comprising:
prompting the user to enable fine adjustment by the user equipment if the user equipment detects that the first distance is equal to the first desired distance.

8. The method according to claim 1, wherein the relevant image of the vehicle comprises an image of a third target placed in the plane of the vehicle, and the image of the third target is acquired by a third camera in the image acquisition assembly; determining position information of the ADAS calibration device relative to the vehicle according to the relevant image of the vehicle by the user equipment comprises:

determining a height difference between the ADAS calibration device and the vehicle according to the image of the third target by the user equipment, where the height difference is determined as a height of the third target placed in the plane of the vehicle relative to the third camera.

9. The method according to claim 8, wherein providing a position adjustment scheme for the ADAS calibration device relative to the vehicle according to the position information by the user equipment comprises:

providing the position adjustment scheme for the ADAS calibration device relative to the vehicle according to the height difference and a preset target height difference by the user equipment.

10. The method according to claim 1, further comprising:
receiving a viewing instruction from a user by the user equipment and displaying the relevant image of the vehicle indicated by the viewing instruction.

11. The method according to claim 1, further comprising:
displaying a user operation guide by the user equipment, thereby guiding a user in moving the ADAS calibration device.

12. An ADAS calibration system, comprising:
an ADAS calibration device, comprising an image acquisition assembly;
a user equipment communicatively connected to the ADAS calibration device and comprising a processor and a memory, where the memory stores a plurality of instructions, and the processor loads the instructions stored in the memory to perform the positioning method for an ADAS calibration device of claim 1.

13. A computer-readable storage medium, wherein the computer-readable storage medium stores a plurality of instructions adapted to be loaded by a processor to perform the positioning method for an ADAS calibration device according to claim 1.

14. The method according to claim 3, wherein the position adjustment scheme comprises prompting a user to move the ADAS calibration system into the preset range.

* * * * *